United States Patent
Fujino et al.

(10) Patent No.: US 12,028,607 B2
(45) Date of Patent: *Jul. 2, 2024

(54) DIGITAL CAMERA WITH PRINTER

(71) Applicant: FUJIFILM Corporation, Tokyo (JP)

(72) Inventors: Rina Fujino, Tokyo (JP); Toshiaki Nagai, Tokyo (JP); Tsuneo Sato, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,096

(22) Filed: Apr. 3, 2023

(65) Prior Publication Data

US 2023/0239569 A1 Jul. 27, 2023

Related U.S. Application Data

(63) Continuation of application No. 17/466,611, filed on Sep. 3, 2021, now Pat. No. 11,647,282, which is a (Continued)

(30) Foreign Application Priority Data

Mar. 15, 2019 (JP) .................................. 2019-048521

(51) Int. Cl.
*H04N 23/661* (2023.01)
*H04N 1/00* (2006.01)
(Continued)

(52) U.S. Cl.
CPC ....... *H04N 23/662* (2023.01); *H04N 1/00265* (2013.01); *H04N 5/2624* (2013.01);
(Continued)

(58) Field of Classification Search
CPC ............. H04N 23/662; H04N 1/00265; H04N 5/2624; H04N 23/698; H04N 23/80;
(Continued)

(56) References Cited

U.S. PATENT DOCUMENTS 6,831,754 B1   12/2004  Delaney
7,075,572 B2 *  7/2006  Kinjo ................. H04N 1/32101
                                                    386/E5.072
(Continued)

FOREIGN PATENT DOCUMENTS

CN      1652595 A    8/2005
CN    104065909 A    9/2014
(Continued)

OTHER PUBLICATIONS

The extended European search report issued by the European Patent Office dated Apr. 4, 2022, which corresponds to European Patent Application No. 19919580.1-1208 and is related to U.S. Appl. No. 17/466,611.

(Continued)

*Primary Examiner* — Chiawei Chen
(74) *Attorney, Agent, or Firm* — Studebaker & Brackett PC

(57) ABSTRACT

A digital camera with a printer is a digital camera with a printer and includes a communication unit that communicates with a digital camera with a printer that is another apparatus, and an image composition unit that generates a composite image in which a first image captured by the digital camera with a printer that is an owned apparatus and a second image captured by the other apparatus are composited, in which the communication unit transmits the composite image to the other apparatus. A user of the other apparatus can also obtain the composite image. Accordingly, the composite image can be enjoyed by capturing images using a plurality of cameras.

20 Claims, 18 Drawing Sheets

Related U.S. Application Data continuation of application No. PCT/JP2019/044616, filed on Nov. 14, 2019.

(51) Int. Cl.
*H04N 5/262* (2006.01)
*H04N 23/698* (2023.01)
*H04N 23/80* (2023.01)
*H04N 101/00* (2006.01)

(52) U.S. Cl.
CPC ........... *H04N 23/698* (2023.01); *H04N 23/80* (2023.01); *H04N 2101/00* (2013.01); *H04N 2201/0084* (2013.01)

(58) Field of Classification Search
CPC ....... H04N 2101/00; H04N 2201/0084; H04N 2201/0082; H04N 2201/3245; H04N 2201/3264; H04N 1/00137; H04N 1/00148; H04N 1/00161; H04N 1/00167; H04N 1/00488; H04N 1/32128; H04N 2201/0018; H04N 1/00172; H04N 1/00188; H04N 1/00347; H04N 1/00477; H04N 1/00196; H04N 1/0044; H04N 1/32016; H04N 1/387; H04N 1/3873; H04N 23/661; G03B 15/05; G03B 2206/00; G03B 2227/00; G03B 17/50; B41J 3/445

See application file for complete search history.

(56) References Cited

U.S. PATENT DOCUMENTS

| | | | | |
|---|---|---|---|---|
| 9,740,447 | B1* | 8/2017 | Krishnasamy | G06F 3/128 |
| 10,547,771 | B2 | 1/2020 | Nishiura et al. | |
| 2001/0024235 | A1* | 9/2001 | Kinjo | H04N 1/32101 |
| | | | | 386/E5.072 |
| 2003/0038971 | A1* | 2/2003 | Renda | G06K 15/02 |
| | | | | 358/1.15 |
| 2005/0174597 | A1 | 8/2005 | Ikeda | |
| 2006/0126096 | A1* | 6/2006 | Yasukaga | G06F 40/174 |
| | | | | 358/1.14 |
| 2008/0297825 | A1* | 12/2008 | Hikichi | H04N 1/4406 |
| | | | | 358/1.14 |
| 2008/0316319 | A1* | 12/2008 | Nomoto | H04N 23/663 |
| | | | | 348/207.99 |
| 2010/0295951 | A1* | 11/2010 | Silverbrook | H04N 1/32598 |
| | | | | 348/207.2 |
| 2012/0246184 | A1 | 9/2012 | Rothschild | |
| 2014/0285679 | A1 | 9/2014 | Saitou | |
| 2017/0004147 | A1* | 1/2017 | Ozawa | G06F 16/9554 |
| 2017/0201672 | A1 | 7/2017 | Hayashi et al. | |
| 2017/0358323 | A1 | 12/2017 | Wagatsuma | |
| 2019/0107416 | A1* | 4/2019 | Fujii | B41J 2/45 |

FOREIGN PATENT DOCUMENTS

| | | |
|---|---|---|
| CN | 104378845 A | 2/2015 |
| CN | 106688227 A | 5/2017 |
| CN | 108215526 A | 6/2018 |
| CN | 108234812 A | 6/2018 |
| EP | 2 177 018 B1 | 9/2017 |
| JP | 2000-059716 A | 2/2000 |
| JP | 2002-112152 A | 4/2002 |
| JP | 2003-023566 A | 1/2003 |
| JP | 2003-324682 A | 11/2003 |
| JP | 2006-081001 A | 3/2006 |
| JP | 2008-270934 A | 11/2008 |
| JP | 2012-070362 A | 4/2012 |

OTHER PUBLICATIONS

An Office Action mailed by China National Intellectual Property Administration dated Oct. 21, 2022, which corresponds to Chinese Patent Application No. 201980094077.0 and is related to U.S. Appl. No. 17/466,611; with English language translation.

International Search Report issued in PCT/JP2019/044616; dated Feb. 10, 2020.

International Preliminary Report On Patentability issued in PCT/JP2019/044616; completed Dec. 2, 2020.

* cited by examiner

DIGITAL CAMERA WITH PRINTER

CROSS-REFERENCE TO RELATED APPLICATIONS

This application is a Continuation of U.S. patent application Ser. No. 17/466,611 filed on Sep. 3, 2021, which is a Continuation of PCT International Application No. PCT/JP2019/044616 filed on Nov. 14, 2019, which claims priority under 35 U.S.C § 119(a) to Japanese Patent Application No. 2019-048521 filed on Mar. 15, 2019. Each of the above application(s) is hereby expressly incorporated by reference, in its entirety, into the present application.

BACKGROUND OF THE INVENTION

1. Field of the Invention

The present invention relates to a digital camera with a printer.

2. Description of the Related Art

In recent years, a digital camera with a printer capable of instantly printing a captured image has been widely used, and various methods of use have been suggested. For example, JP2002-112152A discloses performing printing using a wirelessly connected external printer in a case where printing cannot be performed using an incorporated printer in a digital camera with a printer.

SUMMARY OF THE INVENTION

In the technology disclosed in JP2002-112152A, an output destination is the external printer, and printing is performed in one way from the digital camera. In such a manner, the technology in the related art does not consider a relationship with another digital camera with a printer, and images cannot be captured and enjoyed by a plurality of users.

The present invention is conceived in view of such a matter, and an object thereof is to provide a digital camera with a printer enabling a composite image to be enjoyed by capturing images using a plurality of cameras.

In order to accomplish the above object, a digital camera with a printer according to a first aspect of the present invention is a digital camera with a printer and comprises a communication unit that communicates with a digital camera with a printer of another apparatus as a client, and an image composition unit that generates a composite image in which a first image captured by the digital camera with a printer of an owned apparatus as a host and a second image captured by the client are composited, in which the communication unit transmits the composite image to the client.

In the first aspect, the composite image in which the image captured by the owned apparatus as the host (side on which the composite image is generated) and the image captured by the other apparatus as the client (side on which the composite image is received) are composited is generated, and the generated composite image is transmitted to the client (the other apparatus). Thus, not only a user of the host (owned apparatus) but also a user of the client (the other apparatus) can obtain the composite image. Accordingly, the composite image can be enjoyed by capturing images using a plurality of cameras. In a case where a plurality of digital cameras according to the first aspect are present, each digital camera can be the host or the client. In addition, the number of digital cameras on the side (client) on which the composite image is received may be one or plural.

The digital camera with a printer according to a second aspect is the digital camera with a printer of the first aspect, in which the image composition unit generates, as the composite image, an image in which the first image and the second image are arranged in different regions of one image. The second aspect prescribes an aspect of the composite image. Shapes and sizes of regions in which the first image and the second image are arranged may be selectable by the user.

The digital camera with a printer according to a third aspect is the digital camera with a printer of the first aspect, in which the image composition unit generates, as the composite image, an image in which the first image and the second image are superimposed. The third aspect prescribes another aspect of the composite image.

The digital camera with a printer according to a fourth aspect is the digital camera with a printer of the third aspect, in which the image composition unit superimposes the first image and the second image based on feature points extracted from the first image and the second image. The fourth aspect prescribes an aspect of an image composition method using superimposition.

The digital camera with a printer according to a fifth aspect is the digital camera with a printer of any one of the first to fourth aspects, in which the image composition unit generates the composite image in a case where a difference between an imaging time point of the first image and an imaging time point of the second image is less than or equal to a threshold value. According to the fifth aspect, the composite image can be generated using images of which imaging timings are aligned. The threshold value for the imaging time points may be changeable by the user.

The digital camera with a printer according to a sixth aspect is the digital camera with a printer of any one of the first to fifth aspects, further comprising a display unit that displays the first image received from the host, in which the communication unit transmits the second image to the host. According to the sixth aspect, the user of the client can check the image (first image) captured by the host.

The digital camera with a printer according to a seventh aspect is the digital camera with a printer of any one of the first to sixth aspects, in which the communication unit transmits information for prompting capturing of the second image to the client. According to the seventh aspect, by transmitting the information for prompting capturing of the second image to the client from the host, the imaging timings can be easily aligned. The information for prompting capturing may be audio or a text. In addition, the information for prompting capturing may be information for causing a light emitting element to emit light.

The digital camera with a printer according to an eighth aspect is the digital camera with a printer of the seventh aspect, further comprising an information output unit that outputs the information for prompting capturing of the second image. According to the eighth aspect, the imaging timings can be easily aligned among a plurality of users. The information output unit can output information using audio, a text, light emission of a light emitting element, and the like.

The digital camera with a printer according to a ninth aspect is the digital camera with a printer of the eighth aspect, in which the communication unit transmits an image captured in accordance with the information received from the host to the host as the second image. According to the ninth aspect, the digital camera with a printer as the host (side on which the composite image is generated) can acquire an image necessary for generating the composite image from the client.

The digital camera with a printer according to a tenth aspect is the digital camera with a printer of any one of the first to ninth aspects, further comprising a print control unit that controls printing of the composite image, in which in a case where the composite image is received from the host, the print control unit causes a printer of the owned apparatus which is the client to print the composite image independently of an instruction operation of a user. According to the tenth aspect, the client can automatically print the composite image.

The digital camera with a printer according to an eleventh aspect is the digital camera with a printer of the tenth aspect, in which in a case where the host is a digital camera with a printer registered on an automatic print permission list, the print control unit causes the printer of the owned apparatus which is the client to print the composite image independently of the instruction operation of the user. According to the eleventh aspect, unintended automatic printing in the client can be prevented.

The digital camera with a printer according to a twelfth aspect is the digital camera with a printer of any one of the first to eleventh aspects, further comprising a storage control unit that controls storage of an image in a recording medium, in which the storage control unit does not store the composite image in a non-temporary recording medium. According to the twelfth aspect, since the composite image is not stored in the non-temporary recording medium (recording medium such as a memory card in which data is not deleted even in a case where power is off), it is possible to prompt the user to perform printing. In addition, rarity of the printed composite image can be increased. In the tenth aspect, the image may be temporarily stored in a recording medium such as a random access memory (RAM) for displaying or printing the composite image.

The digital camera with a printer according to a thirteenth aspect is the digital camera with a printer of any one of the first to eleventh aspects, further comprising a storage control unit that controls storage of an image in a recording medium, in which the storage control unit stores the composite image in a non-temporary recording medium. According to the thirteenth aspect, the composite image can be stored.

The digital camera with a printer according to a fourteenth aspect is the digital camera with a printer of any one of the first to thirteenth aspects, in which the communication unit transmits information indicating a message to the client by associating the information with the composite image. The information indicating the message may be data of a text, audio, or the like or may be information such as a uniform resource locator (URL) indicating a location at which data of a text, audio, or the like is stored.

The digital camera with a printer according to a fifteenth aspect is the digital camera with a printer of any one of the first to fourteenth aspects, further comprising an output unit that outputs the message based on the information indicating the message. In a case where information such as audio or an image is directly associated with the composite image, the message can be output. In a case where information such as the URL indicating a location of audio, an image, or the like is associated, the message acquired by accessing a server or the like can be output. According to the fifteenth aspect, the user can enjoy a message of another user who creates the composite image.

The digital camera with a printer according to a sixteenth aspect is the digital camera with a printer of any one of the first to fifteenth aspects, further comprising a composite image display unit that displays the composite image. According to the sixteenth aspect, the composite image can be visually recognized.

The digital camera with a printer according to a seventeenth aspect is the digital camera with a printer of any one of the first to sixteenth aspects, in which the communication unit communicates with the digital camera with a printer which is the other apparatus using short range wireless communication. According to the seventeenth aspect, transmission and reception of images and generation and printing of the composite image can be directly enjoyed between nearby users.

The digital camera with a printer according to an eighteenth aspect is the digital camera with a printer of any one of the first to seventeenth aspects, in which the communication unit communicates with the digital camera with a printer which is the other apparatus through an information communication network. According to the eighteenth aspect, transmission and reception of images and generation and printing of the composite image can be enjoyed between users far from each other through the information communication network such as the Internet.

As described above, according to the digital camera with a printer according to an aspect of the present invention, the composite image can be enjoyed by capturing images using a plurality of cameras.

DESCRIPTION OF THE PREFERRED EMBODIMENTS

An embodiment of a digital camera with a printer according to the present invention will be described in detail below. In description, the appended drawings will be referred to.

<Digital Camera with Printer>

A digital camera with a printer 10 is a digital camera incorporating a printer and has a function of instantly printing a captured image. The digital camera with a printer 10 of the present embodiment performs printing on an instant film using an instant film pack. In addition, the digital camera with a printer 10 of the present embodiment has an audio recording function and can record audio in association with the captured image.

<Exterior Configuration>

Figure 1:
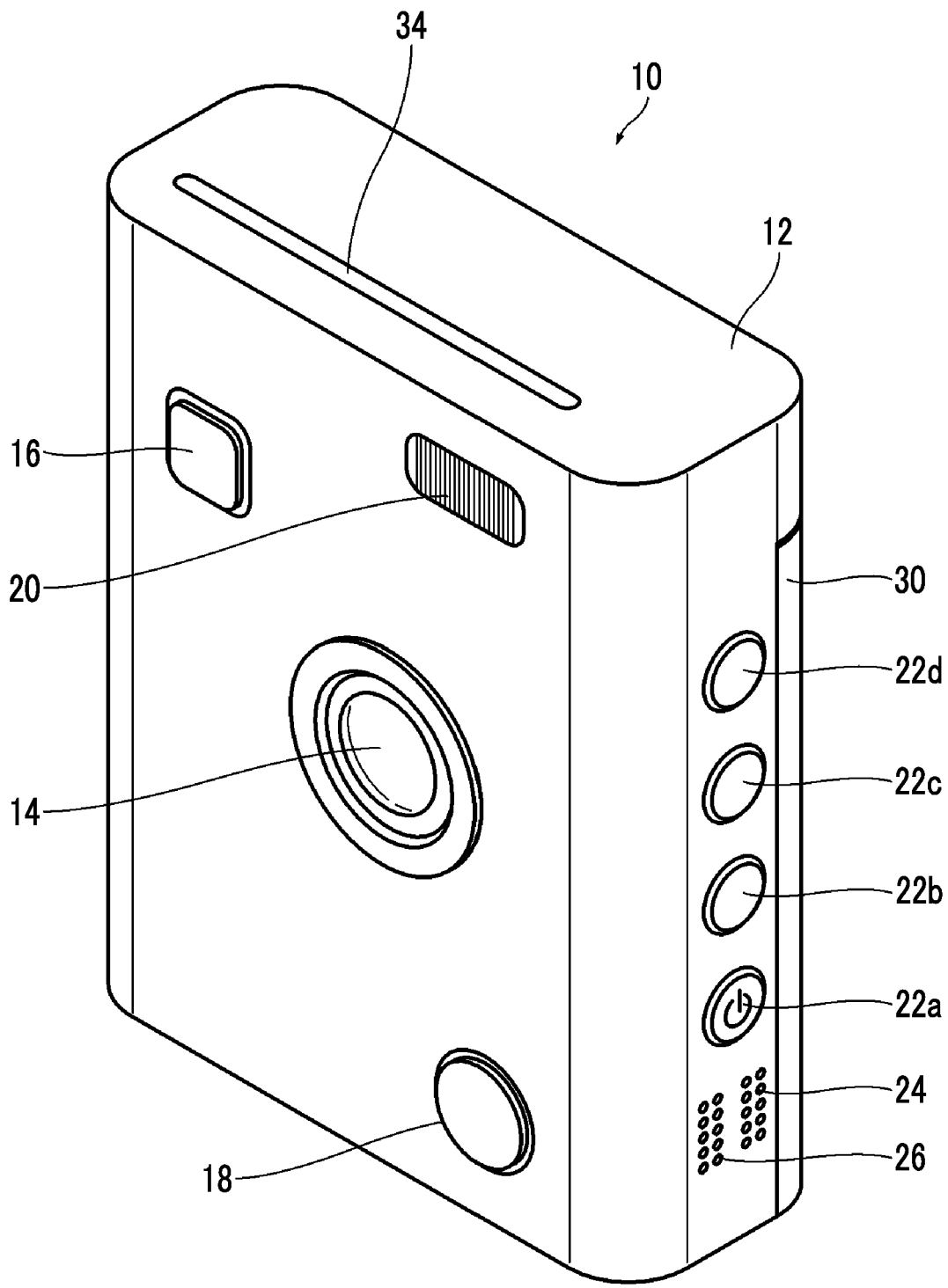
FIG. 1 is a perspective front view illustrating a digital camera with a printer.
Figure 2:
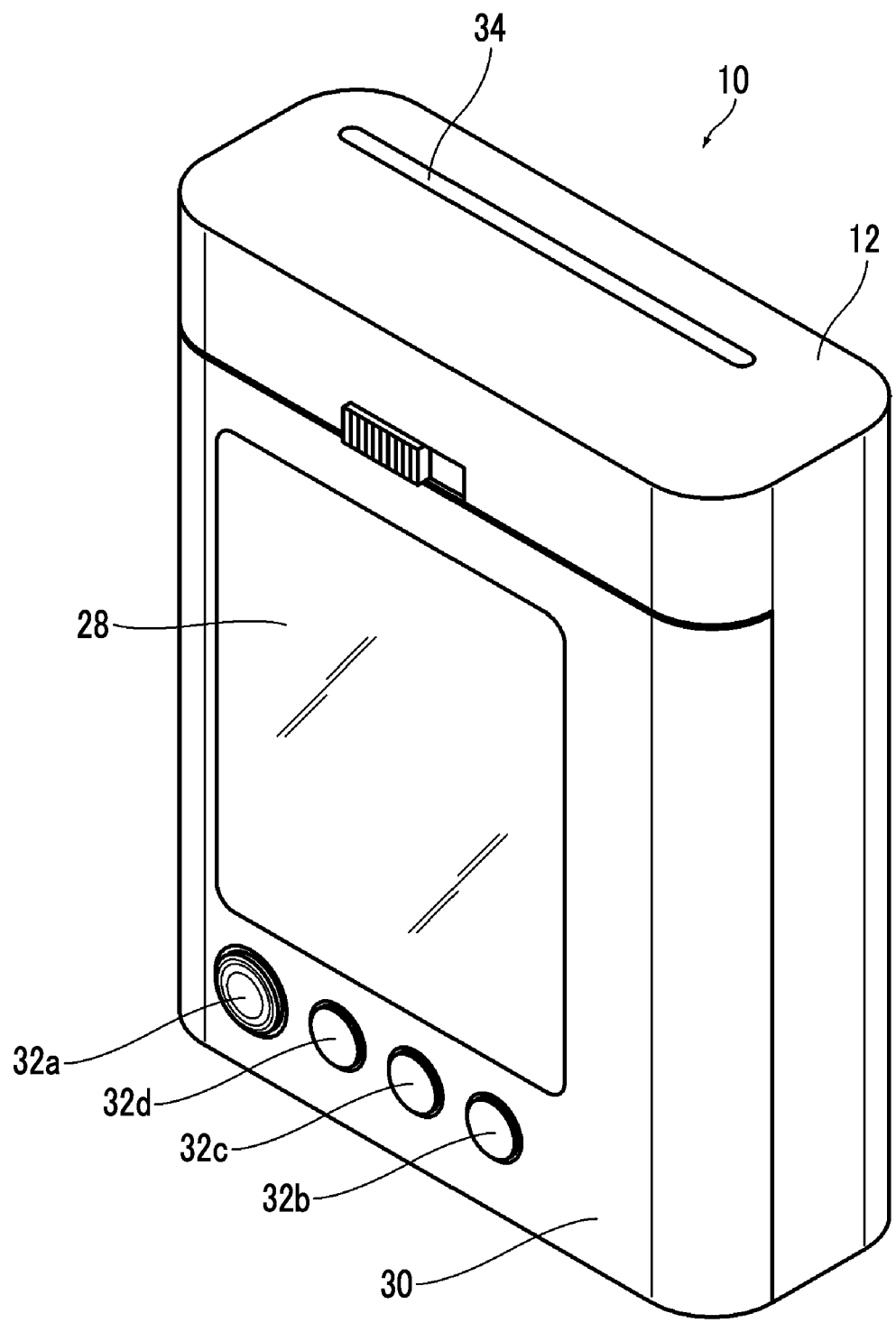
FIG. 2 is a perspective rear view illustrating the digital camera with a printer.

FIG. 1 is a perspective front view illustrating an example of the digital camera with a printer. FIG. 2 is a perspective rear view of the digital camera with a printer illustrated in FIG. 1.

As illustrated in FIG. 1 and FIG. 2, the digital camera with a printer 10 includes a portable camera body 12. The camera body 12 has a small thickness in a forward-rearward direction and has a longitudinal rectangular parallelepiped shape of which a dimension in a longitudinal direction is longer than a dimension in a lateral direction.

As illustrated in FIG. 1, an imaging lens 14, a release button 16, an audio recording button 18, an electronic flash light emission window 20, and the like are comprised on a front surface side of the camera body 12. In addition, a power button 22a, a menu button 22b, an OK button 22c, a mode switching button 22d, a microphone hole 24, a speaker hole 26, and the like are comprised on a side surface on one side of the camera body 12. The release button 16 is a button for issuing an instruction to record an image. The power button 22a is a button for powering the digital camera with a printer 10 ON and OFF. The menu button 22b is a button for calling a menu screen. The OK button is a button for issuing an OK instruction. The mode switching button 22d is a button for switching between an auto print mode and a manual print mode in an imaging mode.

As illustrated in FIG. 2, a touch panel display 28, a film lid cover 30, and various types of operation buttons are comprised on a rear surface side of the camera body 12. The film lid cover 30 is a cover for opening and closing a film loading chamber. The types of operation buttons include a joystick 32a, a print button 32b, a play button 32c, a cancel button 32d, and the like. The print button 32b is a button for issuing an instruction to perform printing. The play button 32c is a button for issuing an instruction to switch to a playback mode. The cancel button 32d is a button for issuing an instruction to cancel an operation.

As illustrated in FIG. 1 and FIG. 2, a film discharge port 34 is comprised on an upper surface of the camera body 12. The instant film on which printing is performed is discharged from the film discharge port 34.

<Configuration of Printer Part of Digital Camera with Printer>

Figure 3:
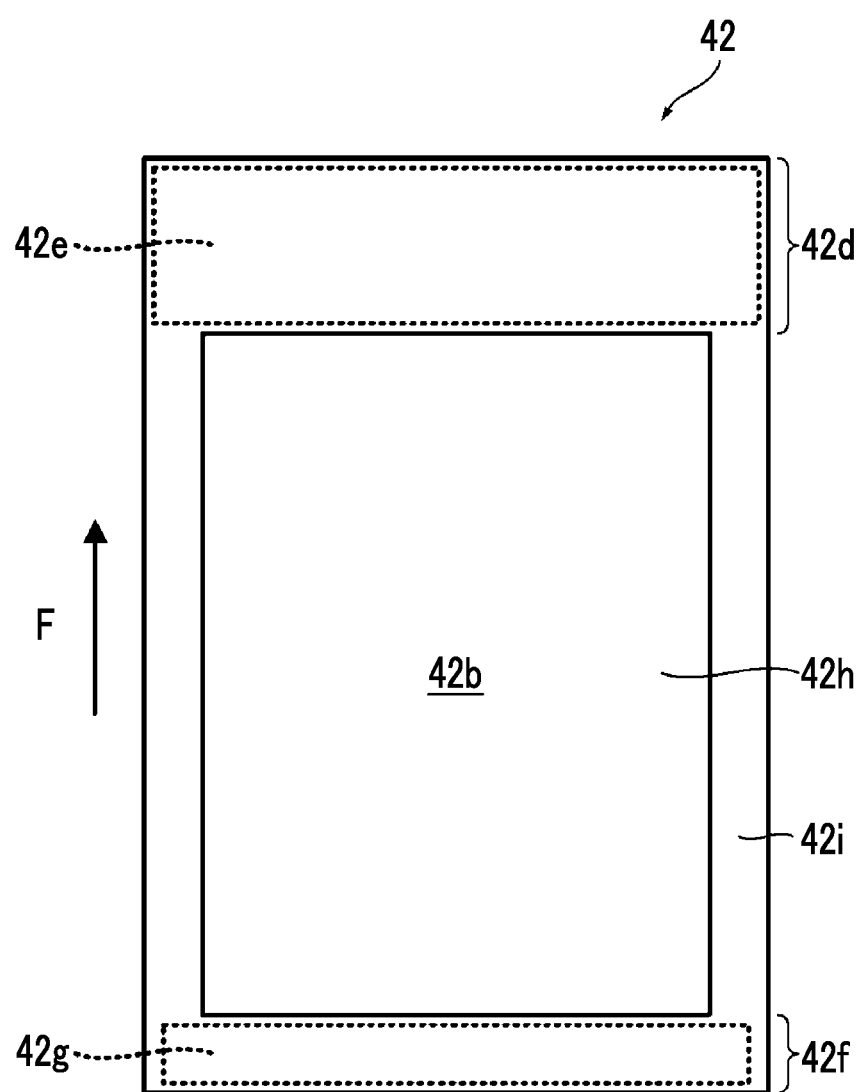
FIG. 3 is a front view of an instant film.
Figure 4:
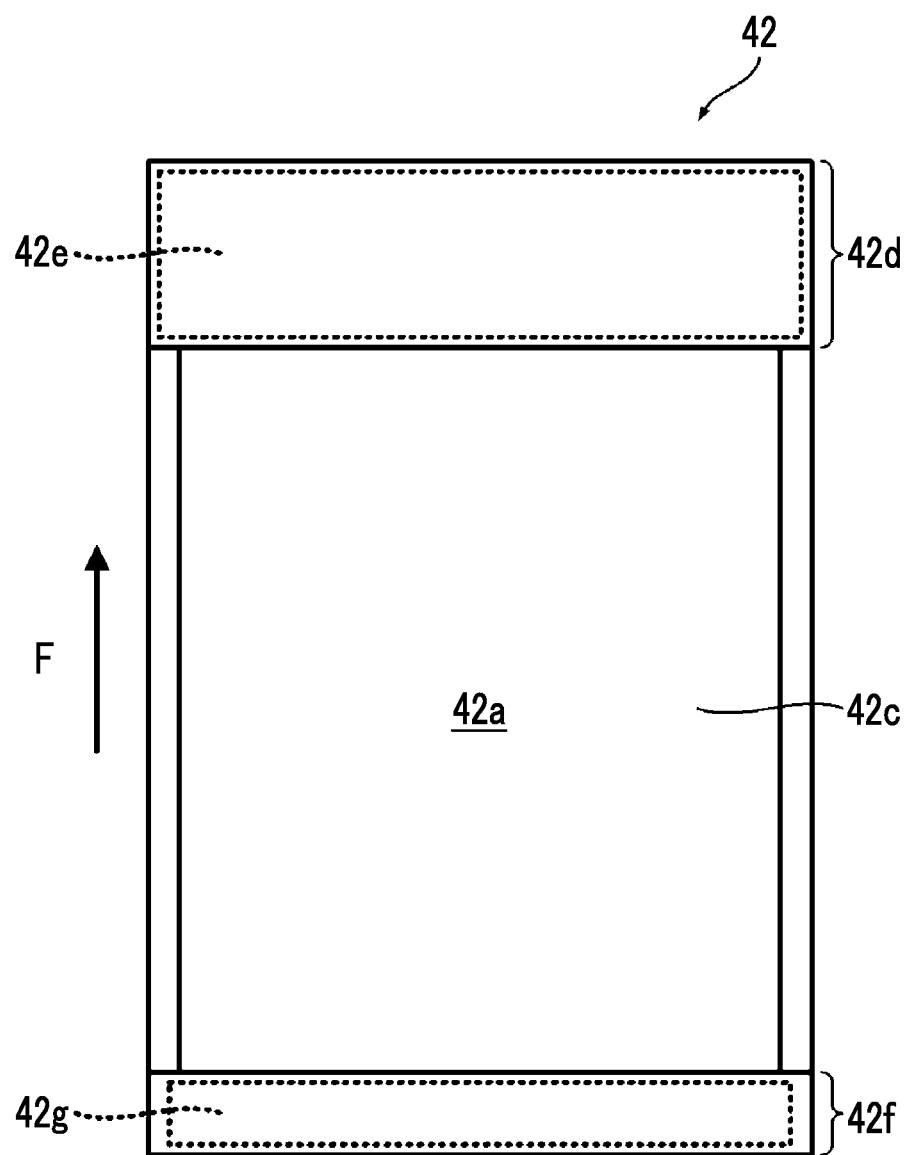
FIG. 4 is a rear view of the instant film.
Figure 5:
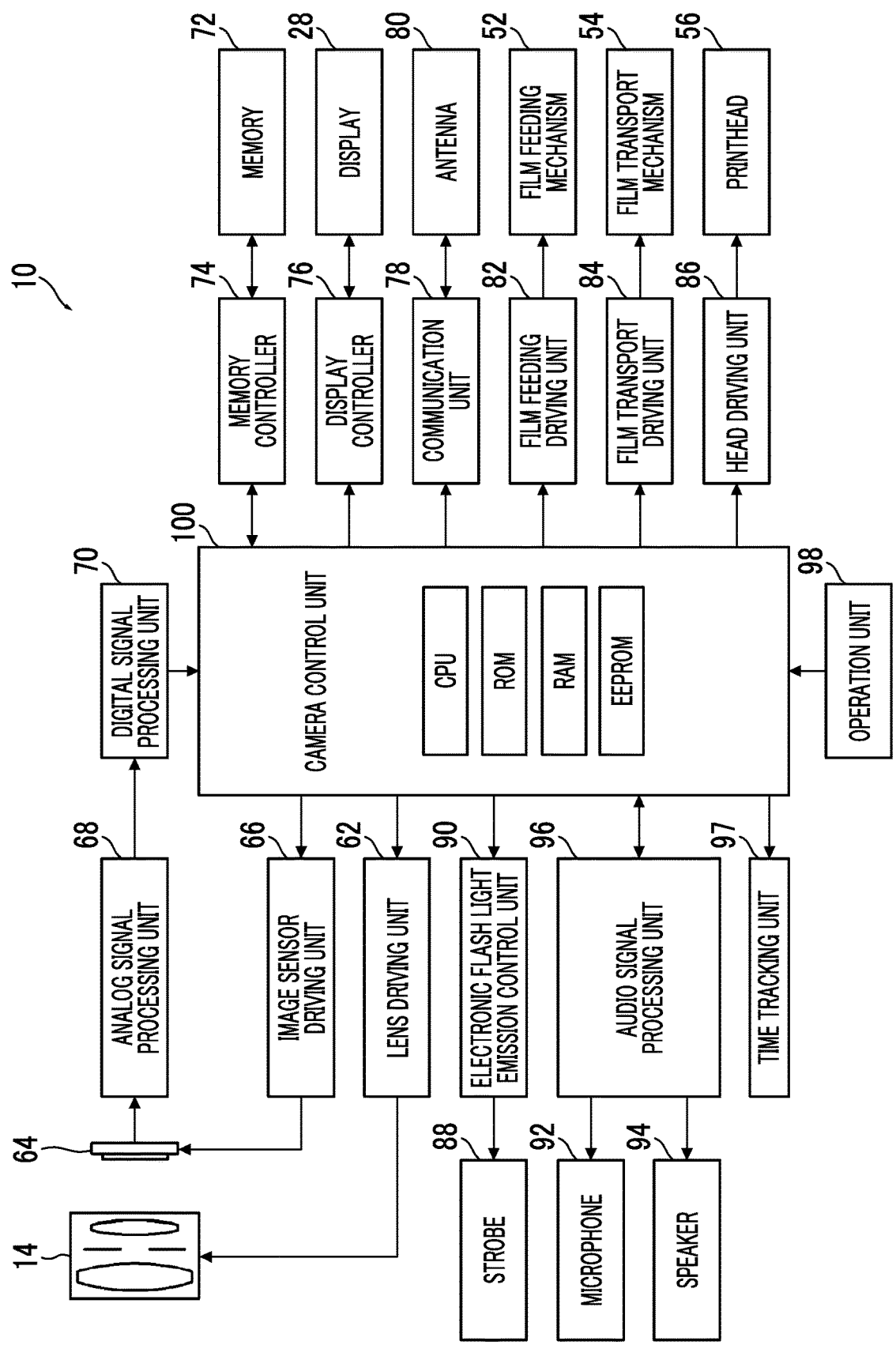
FIG. 5 is a diagram illustrating an electric configuration of the digital camera with a printer.

The digital camera with a printer 10 comprises the film loading chamber (not illustrated), a film feeding mechanism 52, a film transport mechanism 54, a printhead 56, and the like as constituents of a printer part that is a print unit (refer to FIG. 5). An instant film pack having a structure in which a plurality of instant films is accommodated in a case is loaded into the film loading chamber. FIG. 3 is a front view of an instant film 42, and FIG. 4 is a rear view of the instant film 42. In FIG. 3 and FIG. 4, a direction indicated by arrow F is a direction of use of the instant film 42, and the instant film 42 is transported in the direction indicated by arrow F. Accordingly, in a case where the instant film 42 is loaded into the digital camera with a printer 10, the direction indicated by arrow F is a discharge direction of the instant film 42.

The instant film 42 is a self-developing instant film having a rectangular card shape. The instant film 42 is configured such that a rear surface side is an exposure surface 42a, and that a front surface side is an observation surface 42b. The exposure surface 42a is a surface on which an image is recorded by exposure. The observation surface 42b is a surface on which the recorded image is observed.

As illustrated in FIG. 3, an observation region 42h is comprised on the observation surface 42b of the instant film 42. In addition, as illustrated in FIG. 4, an exposure region 42c, a pod portion 42d, and a trap portion 42f are comprised on the exposure surface 42a of the instant film 42. The instant film 42 is subjected to development treatment by spreading a development treatment liquid of the pod portion 42d onto the exposure region 42c after exposure. The pod portion 42d incorporates a development treatment liquid pod 42e containing the development treatment liquid. The development treatment liquid of the pod portion 42d is squeezed from the pod portion 42d and spread onto the exposure region 42c by passing the instant film 42 through a roller pair. The development treatment liquid that is left in spreading processing is trapped by the trap portion 42f. The trap portion 42f incorporates an absorbent material 42g.

The instant film pack is loaded into the film loading chamber, not illustrated, that is disposed inside the camera body 12. In a case of printing, the film is fed one sheet at a time by a claw (claw-shaped member), not illustrated, of the film feeding mechanism 52 and transported by a roller, not illustrated, of the film transport mechanism 54. In addition, during transport, the development treatment liquid is subjected to the spreading processing by pressing the pod portion 42d of the instant film 42 by a spreading roller pair, not illustrated. The printhead 56 is configured with a line exposure head and records the image on the instant film 42 in a single pass by irradiating the exposure surface 42a of the instant film 42, which is transported by the film transport mechanism 54, with print light one line at a time. A frame 42i is comprised around the observation region 42h, and the image is displayed inside the frame 42i.

<Electric Configuration of Digital Camera with Printer>

FIG. 5 is a block diagram illustrating a main portion of an electric configuration of the digital camera with a printer.

As illustrated in the drawing, the digital camera with a printer 10 comprises the imaging lens 14, a lens driving unit 62, an image sensor 64, an image sensor driving unit 66, an analog signal processing unit 68, a digital signal processing unit 70, a memory 72, a memory controller 74, a display 28, a display controller 76, a communication unit 78, and an antenna 80. In addition, the digital camera with a printer 10 comprises a film feeding driving unit 82, a film transport driving unit 84, a head driving unit 86, a strobe 88, an electronic flash light emission control unit 90, a microphone 92, a speaker 94, an audio signal processing unit 96, a time tracking unit 97, an operation unit 98, and a camera control unit 100.

The imaging lens 14 causes an optical image of a subject to be formed on a light-receiving surface of the image sensor 64. The imaging lens 14 has a focal point adjustment function and comprises, not illustrated, a stop and a shutter. The lens driving unit 62 includes a motor driving the focal point adjustment function of the imaging lens 14 and a driving circuit thereof, a motor driving the stop and a driving circuit thereof, and a motor driving the shutter and a driving circuit thereof, and operates a focal point adjustment mechanism, the stop, and the shutter in accordance with an instruction from the camera control unit 100.

The image sensor 64 is configured with a two-dimensional solid-state imaging element such as a charge coupled device (CCD) image sensor or a complementary metal oxide semiconductor (CMOS) image sensor. The image sensor 64 has an imaging region of an aspect ratio corresponding to a printable region of the used instant film. The image sensor driving unit 66 includes a driving circuit of the image sensor 64 and operates the image sensor 64 in accordance with an instruction from the camera control unit 100.

In the digital camera with a printer 10 of the present embodiment, the imaging lens 14 and the image sensor 64 constitute an imaging unit.

The analog signal processing unit 68 fetches an analog image signal of each pixel output from the image sensor 64, digitizes the analog image signal by performing signal processing (for example, correlative double sampling processing or amplification processing), and outputs the digitized image signal.

The digital signal processing unit 70 fetches the digital image signal output from the analog signal processing unit 68 and generates image data by performing signal processing (for example, gradation transformation processing, white balance correction processing, gamma-correction processing, demosaicing processing, or YC transformation processing).

The memory 72 is a non-temporary recording medium storing the image data obtained by imaging and audio data. For example, a memory card is used as the memory 72. The memory 72 is an example of a storage unit. The memory controller 74 reads and writes data in the memory 72 under control of the camera control unit 100.

The display 28 is configured with, for example, a liquid crystal display (LCD) or an organic electro-luminescence display (OELD). Besides, the display 28 may be configured with a plasma display, a field emission display (FED), an electronic paper, or the like. The display controller 76 displays a video on the display 28 under control of the camera control unit 100.

The communication unit 78 wirelessly communicates with another digital camera with a printer 10 (another apparatus) through the antenna 80 under control of the camera control unit 100. The communication unit 78 can directly communicate with the other apparatus in a short range using short range wireless communication such as a near field communication (NFC) standard or Bluetooth (registered trademark). In addition, the communication unit 78 can connect to an information communication network such as the Internet through a Wi-Fi spot (Wi-Fi: registered trademark) and communicate with the other digital camera with a printer 10 (the other apparatus) regardless of distance.

The film feeding driving unit 82 includes a motor driving the claw (claw-shaped member), not illustrated, of the film feeding mechanism 52 and a driving circuit thereof, and operates the claw by driving the motor under control of the camera control unit 100.

The film transport driving unit 84 includes a motor driving a transport roller pair, not illustrated, of the film transport mechanism 54 and a driving circuit thereof and a motor driving the spreading roller pair, not illustrated, and a driving circuit thereof, and operates the transport roller pair and the spreading roller pair by driving the motor of the transport roller pair and the motor of the spreading roller pair under control of the camera control unit 100.

The head driving unit 86 includes a driving circuit of the printhead 56 and drives the printhead 56 under control of the camera control unit 100.

The strobe 88 comprises, for example, a xenon tube or a light emitting diode (LED) as a light source and irradiates the subject with electronic flash light by causing the light source to emit light. Irradiation with the electronic flash light is performed from the electronic flash light emission window 20 (refer to FIG. 1) comprised on a front surface of the camera body 12. The electronic flash light emission control unit 90 includes a driving circuit of the strobe 88 and causes the strobe 88 to emit light in accordance with an instruction from the camera control unit 100.

The microphone 92 collects audio from an outside through the microphone hole 24 (refer to FIG. 2) comprised in the camera body 12. The microphone 92 is an example of an audio collection unit. The speaker 94 outputs audio to the outside from the speaker hole 26 comprised in the camera body 12. The audio signal processing unit 96 digitizes an audio signal input from the microphone 92 by performing signal processing and outputs the digitized audio signal. In addition, the audio signal processing unit 96 performs signal processing on audio data provided from the camera control unit 100 and outputs the audio data from the speaker 94. The time tracking unit 97 holds date and time information, and the camera control unit 100 sets an imaging time point (date and time) by referring to the information.

The operation unit 98 includes various operation members such as the release button 16, the audio recording button 18, the power button 22*a*, the menu button 22*b*, the OK button 22*c*, the joystick 32*a*, the print button 32*b*, the play button 32*c*, and the cancel button 32*d* and a signal processing circuit thereof, and outputs a signal based on an operation of each operation member to the camera control unit 100.

The camera control unit 100 is a control unit that controls an operation of the entire digital camera with a printer 10. The camera control unit 100 comprises a central processing unit (CPU), a read only memory (ROM), a random access memory (RAM), an electronically erasable and programmable read only memory (EEPROM), and the like. The camera control unit 100 is a computer configured with the CPU and the like and implements various functions described below by executing a control program.

<Functional Configuration of Camera Control Unit>

Figure 6:
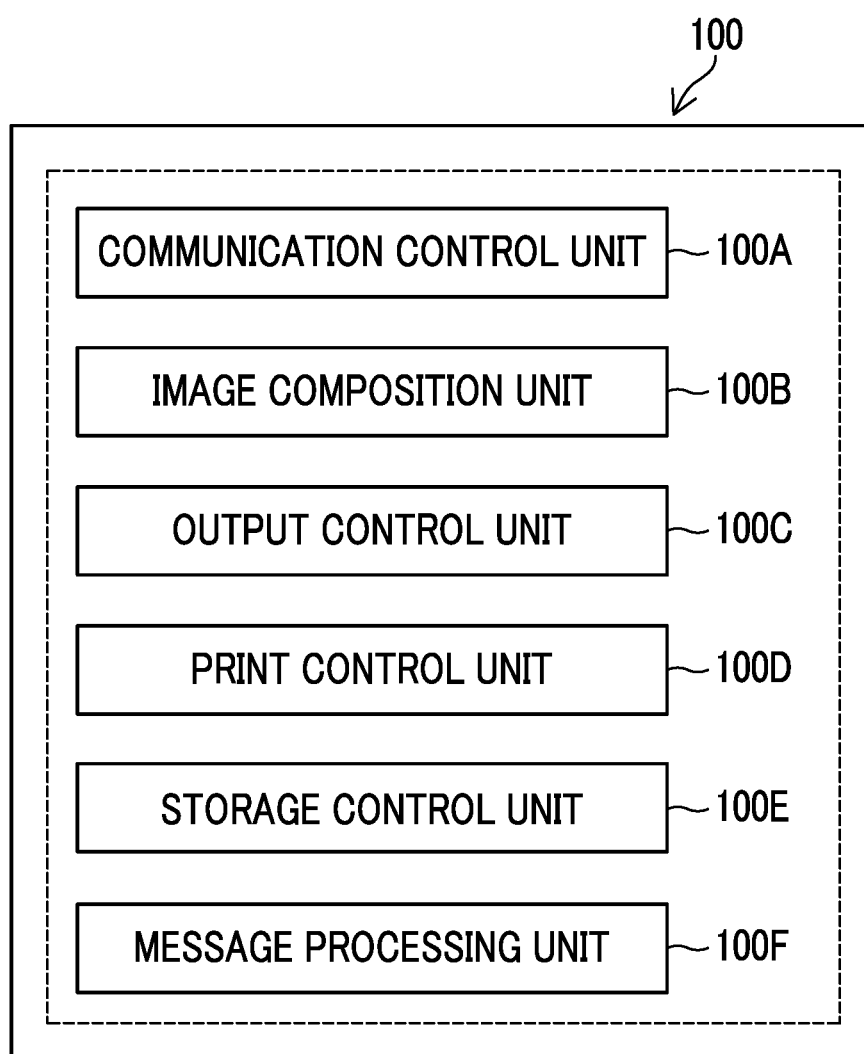
FIG. 6 is a function block diagram of a camera control unit.

FIG. 6 is a diagram illustrating a functional configuration of the camera control unit 100. The camera control unit 100 comprises a communication control unit 100A (communication unit), an image composition unit 100B (image composition unit), an output control unit 100C (an information output unit, an output unit, and a composite image display unit), a print control unit 100D (print control unit), a storage control unit 100E (storage control unit), and a message processing unit 100F (output unit).

A function of each unit of the camera control unit 100 described above can be implemented using various processors and a recording medium. For example, the various processors include a CPU that is a general-purpose processor implementing various functions by executing software (program). In addition, the various processors include a graphics processing unit (GPU) that is a processor specialized in image processing, and a programmable logic device (PLD) such as a field programmable gate array (FPGA). The programmable logic device is a processor of which a circuit configuration can be changed after manufacturing. In a case of learning or recognizing images, a configuration using the GPU is effective. Furthermore, the various processors include a dedicated electric circuit or the like that is a processor such as an application specific integrated circuit (ASIC) having a circuit configuration dedicatedly designed to execute a specific type of processing.

The function of each unit may be implemented by one processor or may be implemented by a plurality of processors of the same type or different types (for example, a plurality of FPGAs, a combination of a CPU and an FPGA, or a combination of a CPU and a GPU). In addition, one processor may have a plurality of functions. As an example of configuring the plurality of functions with one processor, first, as represented by a computer, a form of configuring one processor with a combination of one or more CPUs and software and causing the processor to implement the plurality of functions is present. Second, as represented by a system on chip (SoC) or the like, a form of using a processor that implements a function of the entire system using one integrated circuit (IC) chip is present. In such a manner, various functions are configured using one or more of the various processors as a hardware structure. Furthermore, a hardware structure of those various processors is more specifically an electric circuit (circuitry) in which circuit elements such as semiconductor elements are combined. The electric circuit may be an electric circuit that implements the functions using a logical sum, a logical product, a logical negation, an exclusive logical sum, and a logical operation of a combination thereof.

In a case where the processor or the electric circuit executes software (program), a code of the executed software readable by a computer (various processors or electric circuits constituting the camera control unit 100 and/or a combination thereof) is stored in a non-temporary recording medium such as a ROM, and the computer refers to the software. The software stored in the non-temporary recording medium includes a program for executing capturing and composition of images, and data used for execution. Instead of the ROM, the non-temporary recording medium in which the code is recorded may be various magneto-optical recording devices, a semiconductor memory, and the like. In a case of processing using the software, for example, a RAM is used as a temporary storage region.

<Processing Related to Generation of Composite Image>

FIG. 7 to FIG. 11 are flowcharts illustrating processing related to generation and the like of a composite image by the digital camera with a printer 10 having the above configuration. In FIG. 7 to FIG. 11, processing on a side (hereinafter, referred to as a "host") requesting generation of the composite image is illustrated on a left side of the drawing, and processing on a side (hereinafter, referred to as a "client") receiving the composite image is illustrated on a right side of the drawing. In FIG. 7 to FIG. 11, two digital cameras with a printer 10 having the above configuration are used. One digital camera with a printer 10 is used as the "host" (first digital camera with a printer), and the other digital camera with a printer 10 (second digital camera with a printer) is used as the "client". The digital cameras with a printer used as the host and the client do not necessarily have completely the same configuration. Digital cameras with a printer having different configurations may be used as the host and the client.

In the digital camera with a printer 10 on a host side, the image composition unit 100B determines whether or not a request to generate the composite image is made (step S100). Whether or not the request is made can be determined by presence or absence of an operation of a user performed on the operation unit 98. In a case where the request to generate the composite image is made (YES in step S100), the image composition unit 100B selects a template of the composite image based on an instruction input of the user provided through the operation unit 98 (step S110). FIGS. 12A to 12E are diagrams illustrating examples of the template. In the examples illustrated in FIGS. 12A to 12E, a boundary between an image (first image) captured by the host and an image (second image) captured by the client is illustrated by a dotted line. As illustrated in the examples, in the template, one image may be divided into left and right parts, upper and lower parts, or in an oblique manner or may be divided into a center portion and a periphery of the image. In addition, the number of divisions is not limited to two and may be three or more. Furthermore, the template may be decorated with a text, a number, a symbol, and the like in addition to the image. The image composition unit 100B generates, as the composite image, an image in which the first image and the second image are arranged in different regions of one image using the selected template. The image composition unit 100B may determine whether or not the request to generate the composite image is made based on a request on a client side. In this case, the client side may transmit a signal for requesting image composition with the second image to the host side, and the host side may start generating the composite image in response to the signal for requesting the image composition transmitted from the client side.

In a case where the template is selected, the image composition unit 100B issues an imaging instruction for the first image (step S120). This imaging instruction can be issued by causing the image composition unit 100B to output a message prompting imaging to the speaker 94 or displaying the message on the display 28. The user can capture a desired image using the digital camera with a printer 10 that is an owned apparatus. In a case where an image is captured by the imaging lens 14, the image sensor 64, and the like (imaging unit), the image composition unit 100B determines that the "first image is captured" (YES in step S130). The camera control unit 100 decides an imaging date and time of the image (first image) by referring to the information in the time tracking unit 97.

Figure 13A:
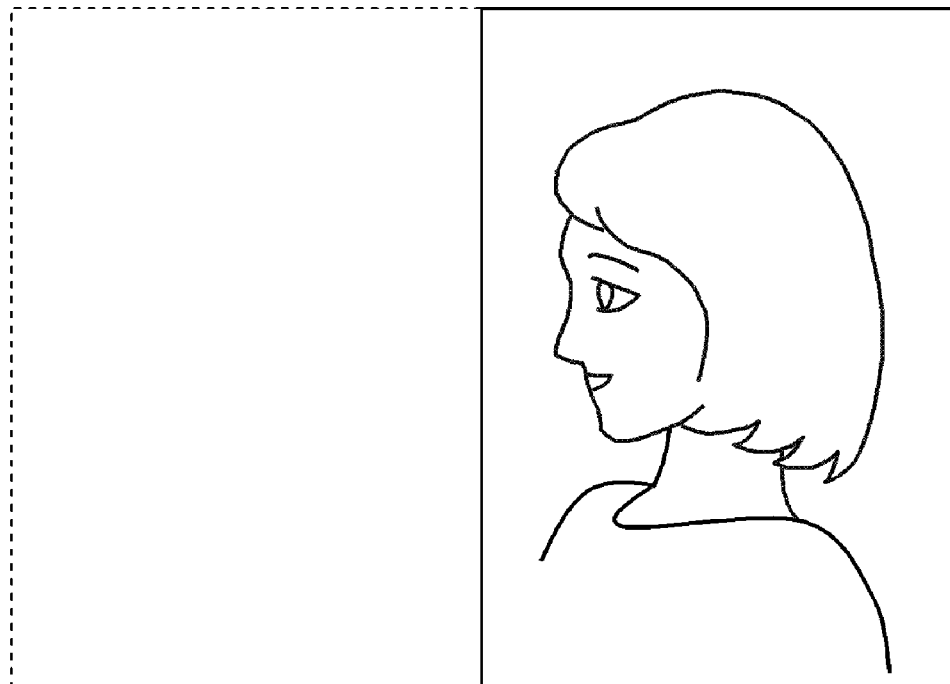
FIGS. 13A and 13B are diagrams illustrating examples of a first image.

In a case where the first image is captured, the communication control unit 100A (communication unit) transmits the first image to the other apparatus (client) through the communication unit 78 (communication unit) and the antenna 80 (communication unit) and issues an imaging instruction for the second image (step S140). As illustrated in FIG. 13A, the image composition unit 100B and the communication control unit 100A can transmit the first image in a state where the first image is arranged in the template selected in step S110. At this point, the image composition unit 100B may cut the first image in accordance with the selected template. In addition, the communication control unit 100A (communication unit) can transmit the imaging instruction for the second image to the other apparatus through the communication unit 78 (communication unit) and the antenna 80 (communication unit).

The digital camera with a printer 10 that is the client receives the first image and the imaging instruction for the second image by the communication unit 78 (communication unit) and the antenna 80 (communication unit) (step S300). The digital camera with a printer 10 (client) that receives the first image displays the received image (first image) on the display 28 (display unit) (step S305). Accordingly, the user can perceive "which image is composited with the image captured by the user". In addition, the output control unit 100C (the information output unit and the display unit) of the client outputs the imaging instruction for the second image by display on the display 28 (the information output unit and the display unit) and/or audio output from the speaker 94 (information output unit) (step S305).

Figure 13B:
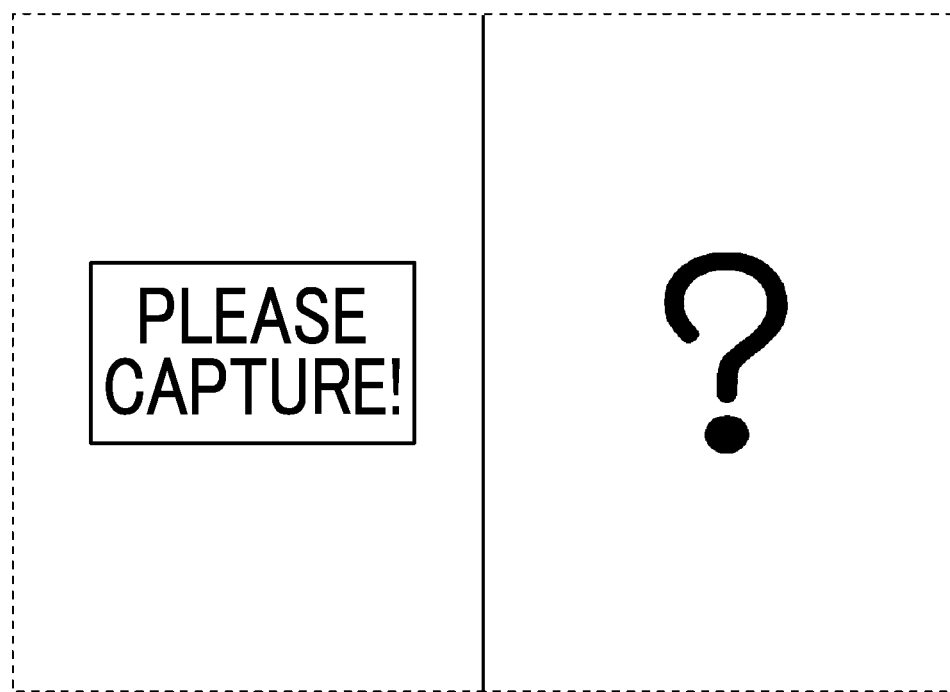

In step S140, the host may not transmit the first image and transmit only the imaging instruction for the second image to the client. In this case, in the client, as illustrated in FIG. 13B, the output control unit 100C can display a question mark (information indicating that the first image is not received) on a right side (region in which the first image is arranged) of the image and display the imaging instruction on a left side (region in which the second image is arranged) of the image on the display 28 (step S305).

Figure 14:
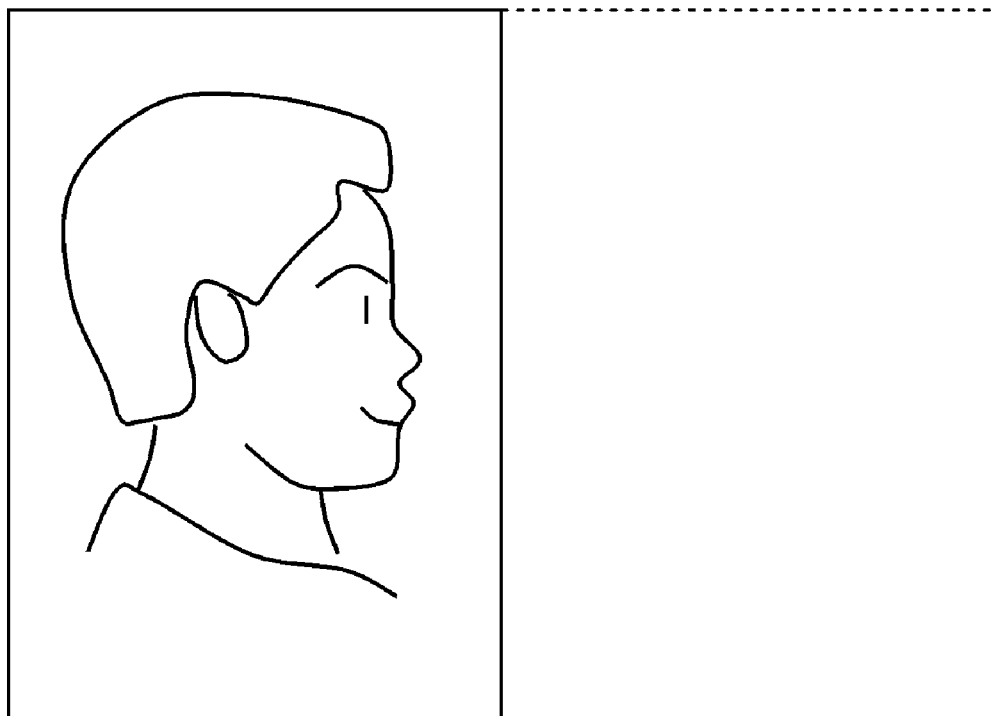
FIG. 14 is a diagram illustrating an example of a second image.

In the client, the image composition unit 100B determines whether or not the second image is captured (step S310). The user can capture a desired image using the digital camera with a printer 10 as the client. In a case where the image is captured by the imaging lens 14, the image sensor 64, and the like (imaging unit), a positive determination is made in step S310. In a case of imaging, the camera control unit 100 decides the imaging time point (date and time) of the image (second image) captured by the client by referring to the information in the time tracking unit 97 in the same manner as described above for the first image. The communication control unit 100A (communication unit) on the client side transmits the second image to the host (the other apparatus) through the communication unit 78 (communication unit) and the antenna 80 (communication unit) (step S320). The output control unit 100C of the client may display the captured image (second image) on the display 28 before transmitting the captured image to the host. Here, it is assumed that the second image illustrated in FIG. 14 is captured.

In the host, the communication control unit 100A determines whether or not the second image is received from the client (step S150). In a case where the second image is received (YES in step S150), the image composition unit 100B determines whether or not a difference between the imaging time point of the first image and the imaging time point of the second image is less than or equal to a threshold value (step S160). In a case where the difference between the imaging time points is greater than the threshold value (NO in step S160), the image composition unit 100B of the host does not generate the composite image, and returns to step S120 and issues the imaging instruction for the first image again.

Figure 15:
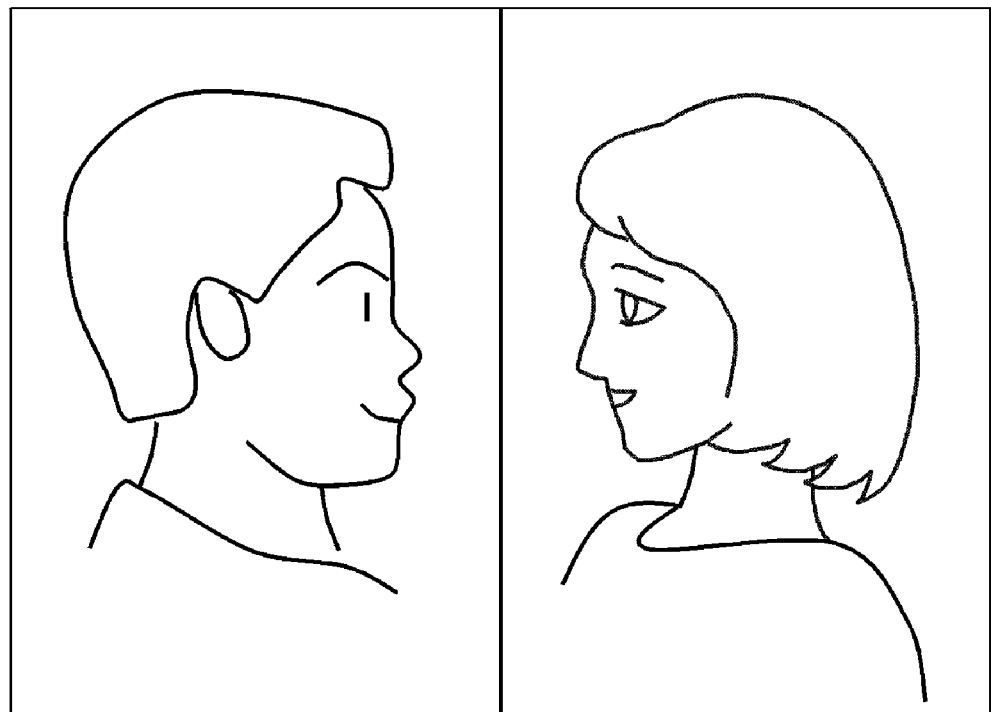
FIG. 15 is a diagram illustrating an example of a composite image.

In a case where the difference between the imaging time points is less than or equal to the threshold value (YES in step S160), the image composition unit 100B of the host generates the composite image by compositing the first image and the second image (step S170). In the examples described using FIG. 12A to FIG. 14, the image composition unit 100B generates, as the composite image, an image in which the first image and the second image are arranged in different regions of one image in accordance with the selected template. At this point, the image composition unit 100B may cut the first image and/or the second image in accordance with the selected template. In addition, the image composition unit 100B displays the generated composite image on the display 28 (composite image display unit) (step S180). Accordingly, the user of the host can check the composite image. Here, it is assumed that the composite image illustrated in FIG. 15 is generated and displayed. In a case where the user of the host is not satisfied with the composite image (for example, in a case where the user issues an instruction to perform processing again through the operation unit 98), the host may return to step S120 or step S140 and perform processing again.

In the processing related to generation of the composite image, a plurality of clients may be present instead of one client. In a case where a plurality of clients are present, the image composition unit 100B of the host may generate the composite image in which images of the host and all clients are arranged in one image, or may generate the composite image in which images of the host and a part (one or more) of the clients are arranged in one image. For example, the digital camera with a printer 10 used by an actor can be used as the host, and a plurality of digital cameras with a printer 10 each used by an individual member of a fan club can be used as the clients. In this case, for example, the image composition unit 100B of the host can generate an image (different images for each client) in which an image captured by the actor and an image of the individual member are composited.

Figure 16:
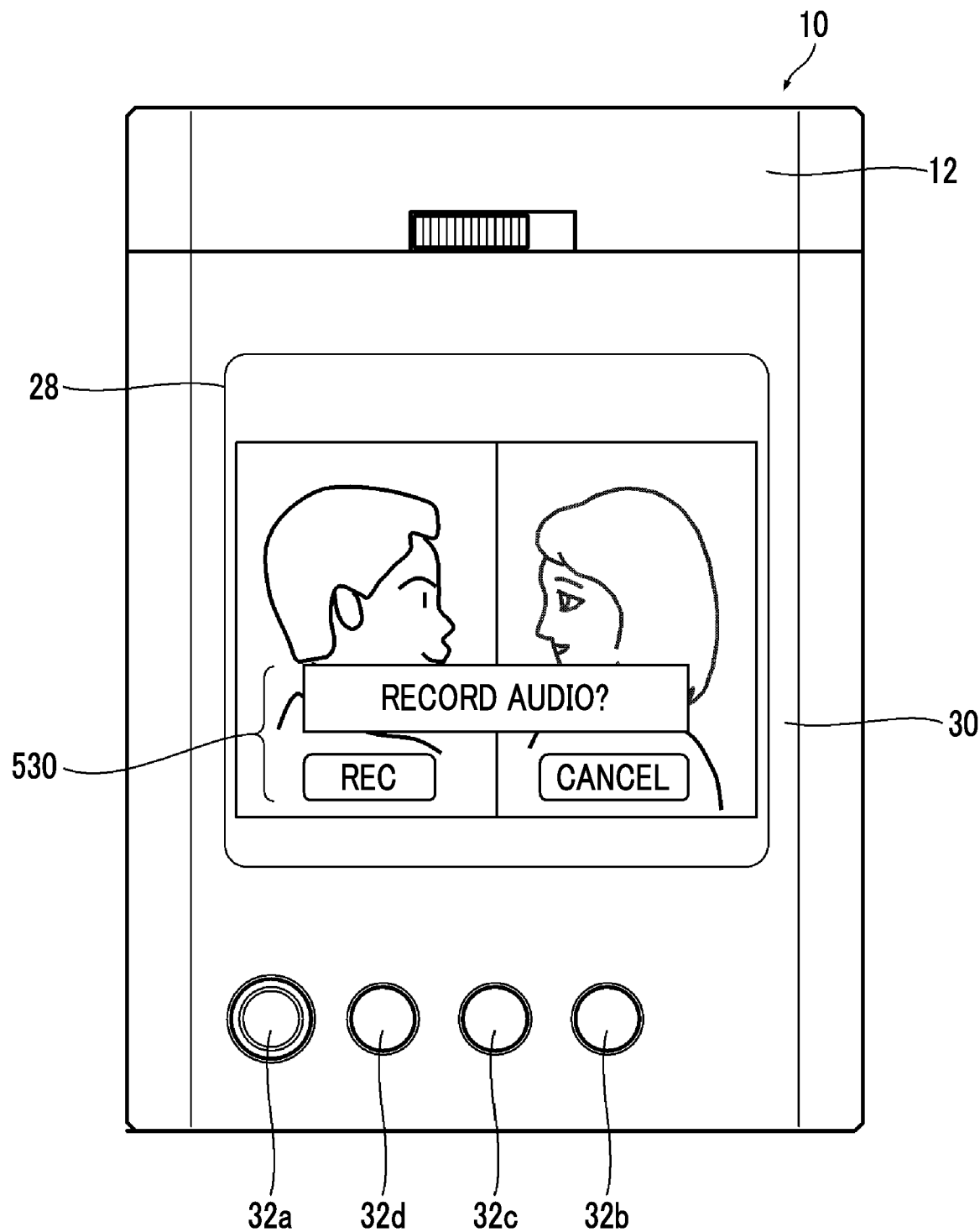
FIG. 16 is a diagram illustrating a state of attaching a message to an image.

In the host, the message processing unit 100F determines whether or not to attach a message to the composite image (step S190). The message processing unit 100F can perform this determination based on an operation of the user performed through the operation unit 98. In a case of attaching the message to the composite image (YES in step S190), for example, as in the example in FIG. 16, the message processing unit 100F displays information 530 for prompting audio recording of the message on the display 28 and generates, as "information indicating the message", audio that is input through the microphone 92 and the audio signal processing unit 96 in response to the display (step S200). The message processing unit 100F may output the information for prompting audio recording of the message from the speaker 94 or may perform audio recording in accordance with an operation performed on the audio recording button 18. A handwritten text, a symbol, or the like input through a touch panel of the display 28 may be generated as the "information indicating the message" and be attached to or superimposed on the image.

Figure 17A:
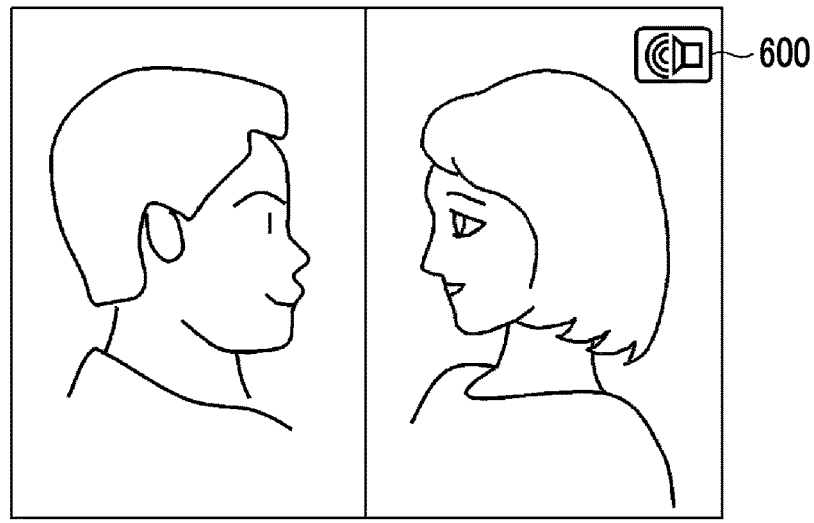
FIGS. 17A to 17C are diagrams illustrating examples of an image to which an audio message is attached.

In the host, the image composition unit 100B and the communication control unit 100A (communication unit) transmits the composite image generated in such a manner (in a case where the message is generated, the information indicating the message is associated with the composite image) to the client through the communication unit 78 (communication unit) and the antenna 80 (communication unit) (step S210). In the client, the communication control unit 100A (communication unit) receives the composite image (and the message) through the communication unit 78 (communication unit) and the antenna 80 (communication unit) (step S330) and displays the composite image on the display 28 (step S340). FIG. 17A is a diagram illustrating an example of the composite image to which an audio message is attached. A mark 600 of a speaker in the composite image indicates that the audio message is attached to the image.

In a case where the message is attached (YES in step S350), the message processing unit 100F of the client outputs information indicating that the message is attached, using the display 28 and/or the speaker 94. In a case where the user of the client issues an instruction to output the message by performing an operation through the operation unit 98 or the microphone 92, the message processing unit 100F (output unit) outputs audio of the message by playing the audio through the audio signal processing unit 96 (output unit) and the speaker 94 (output unit) (step S360). In a case where the handwritten text, the symbol, or the like is attached as the message, the message processing unit 100F (output unit) may display the message on the display 28 by superimposing the message on the composite image. In addition, the print control unit 100D may print the message such as the text or the symbol by superimposing the message on the composite image.

Figure 17B:
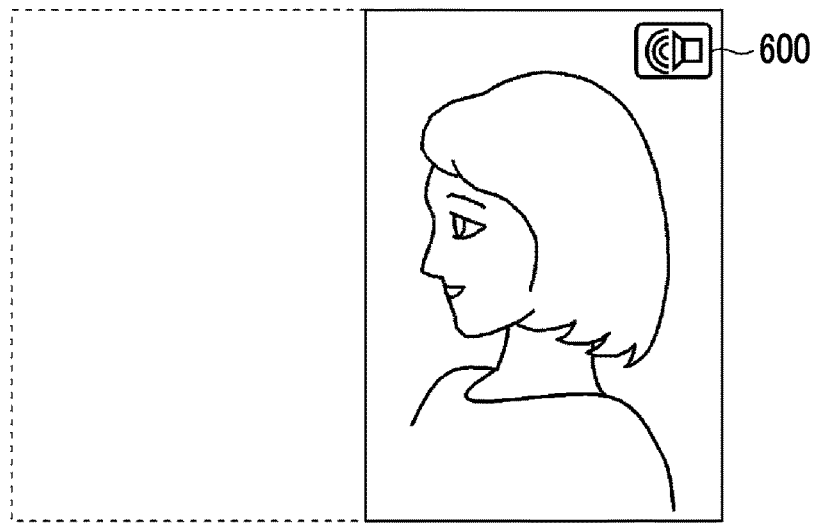
Figure 17C:
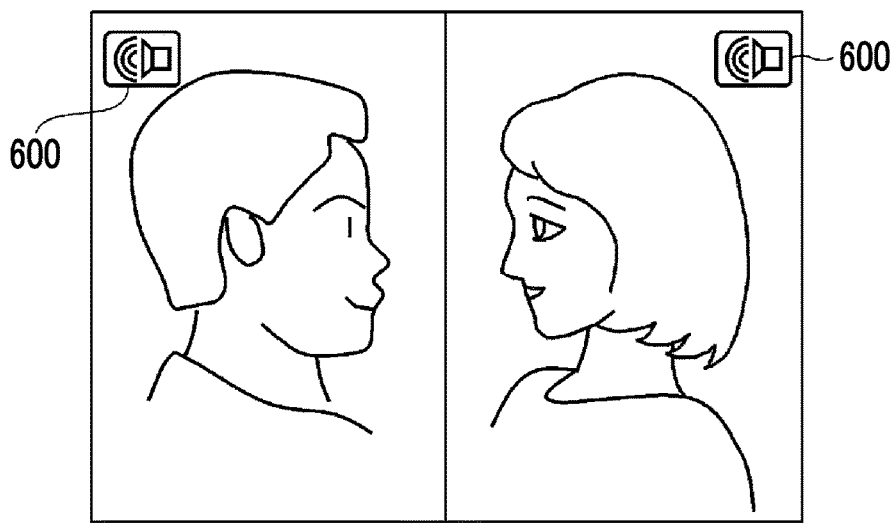

While a case where the host attaches the message to the composite image is described in the above aspect, the message may be generated and attached in a case where the host transmits the first image to the client, and/or in a case where the client transmits the second image to the host. FIG. 17B is an example of attaching the message in a case of transmitting the first image. FIG. 17C illustrates an example of generating the composite image in a state where the message is attached to both of the first image and the second image.

In the client that receives the composite image from the host, the print control unit 100D (print control unit) determines whether or not the host is the digital camera with a printer 10 registered on an "automatic print permission list" (step S370). In a case where the host is registered on the list, the print control unit 100D causes the printer (configured with the printhead 56, the film feeding mechanism 52, the film transport mechanism 54, and the driving units thereof; refer to FIG. 5) of the owned apparatus to print the composite image independently of an instruction operation of the user (step S380). In addition, even in a case where the composite image is received from the host not registered on the "automatic print permission list", the print control unit 100D may determine whether or not to perform printing in accordance with an operation of the user (step S390) and perform printing in a case where a positive determination is made. For example, the print control unit 100D can create the "automatic print permission list" based on individual identification information of the digital camera with a printer 10 or an operation of the user performed through the operation unit 98 and store the automatic print permission list in the EEPROM (refer to FIG. 5) of the camera control unit 100, and can refer to the automatic print permission list in a case of determination in step S370.

Figure 18:
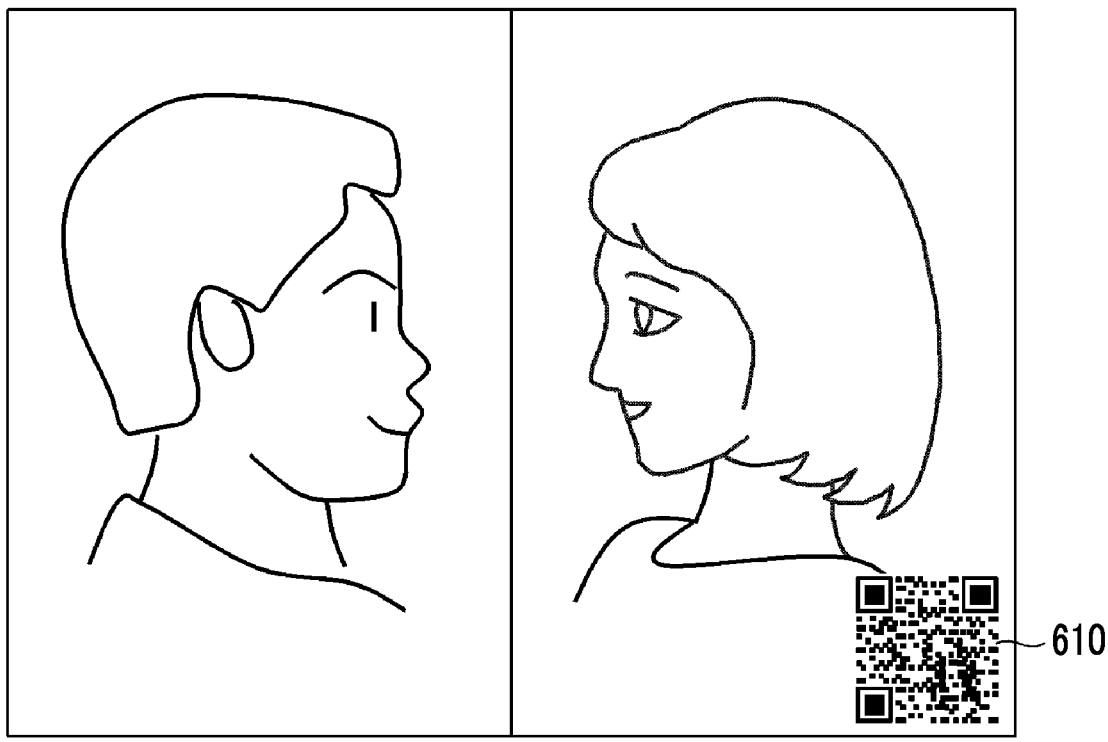
FIG. 18 is a diagram illustrating an example of a composite image on which a two-dimensional barcode indicating an audio message is superimposed.

In a case where the composite image is printed, the user cannot refer to the audio message associated with the composite image from a printout. In this case, in a case of printing the composite image to which the audio message is attached, the message processing unit 100F and the communication control unit 100A can upload the audio message to a storage device (server or the like) on a network through the communication unit 78 and the antenna 80 and acquire information (a two-dimensional barcode, a URL, or the like) indicating an upload destination. The print control unit 100D can print the information by superimposing the information on the composite image. FIG. 18 is an example illustrating a state where a two-dimensional barcode 610 indicating the upload destination of the message is displayed by superimposing the two-dimensional barcode 610 on the composite image. The user can read out the two-dimensional barcode using a smartphone or other apparatuses and an application and check the audio message by accessing the server or the like.

After the composite image is printed (step S380), the storage control unit 100E (storage control unit) of the client finishes processing without storing the composite image in the memory 72 (non-temporary recording medium). Accordingly, a rarity value of the printout can be increased, and printing can be promoted.

Meanwhile, in the host, after the composite image (and the message) is transmitted to the client (step S210), the storage control unit 100E (storage control unit) determines whether or not to store the composite image in the memory 72 (step S220). The storage control unit 100E can perform this determination based on an operation of the user performed through the operation unit 98 or the like. In a case where a positive determination is made (YES in step S220), the storage control unit 100E stores the composite image in the memory 72 (step S230) and finishes processing. The host may transmit the composite image again in a case where a request is made from the client.

As described above, according to the digital camera with a printer 10 of the present embodiment, the user can enjoy the composite image by capturing images using a plurality of cameras.

<Modification Example Related to Printing and Storage of Composite Image>

Figure 7:
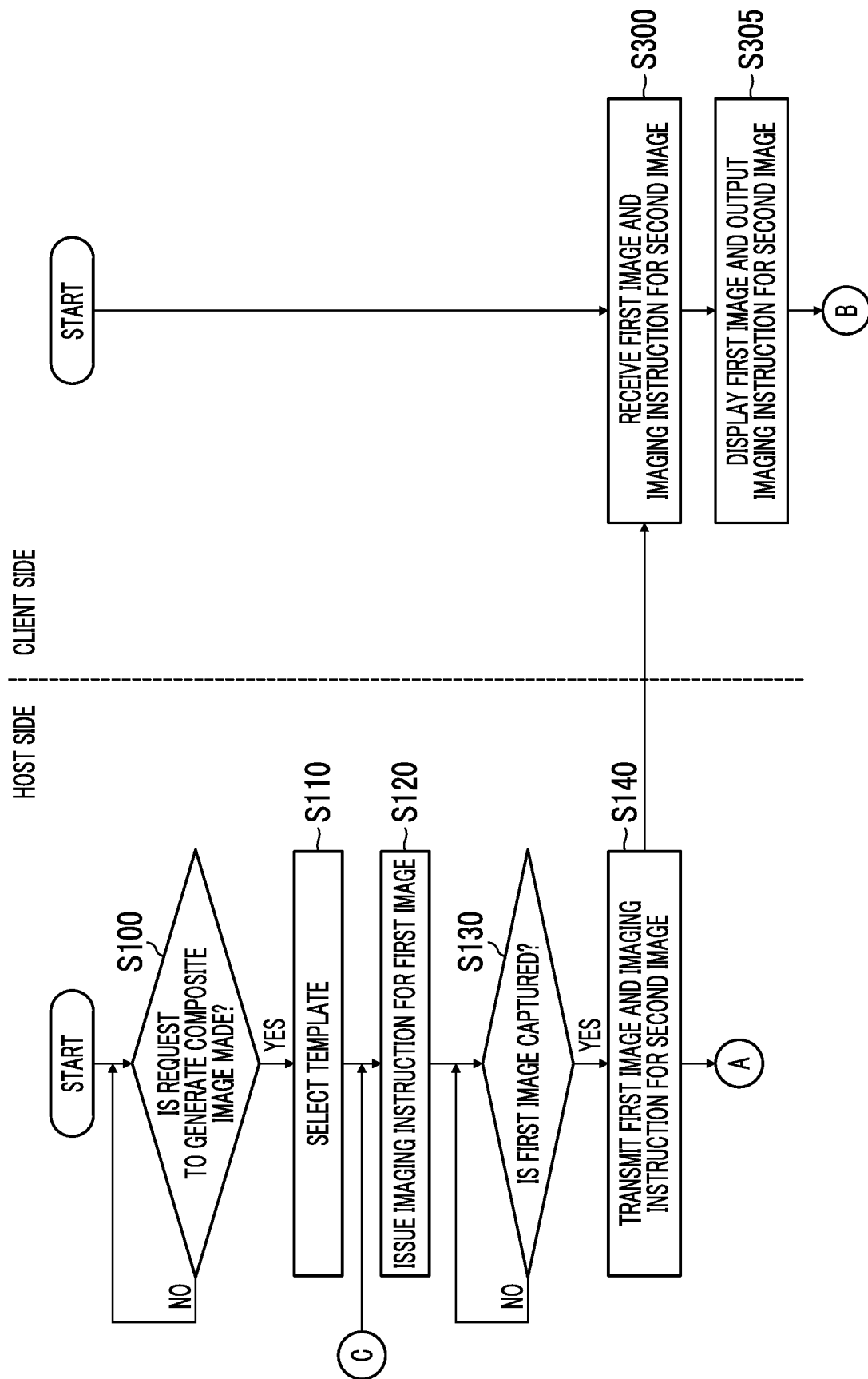
FIG. 7 is a flowchart illustrating a procedure of processing related to image composition.
Figure 8:
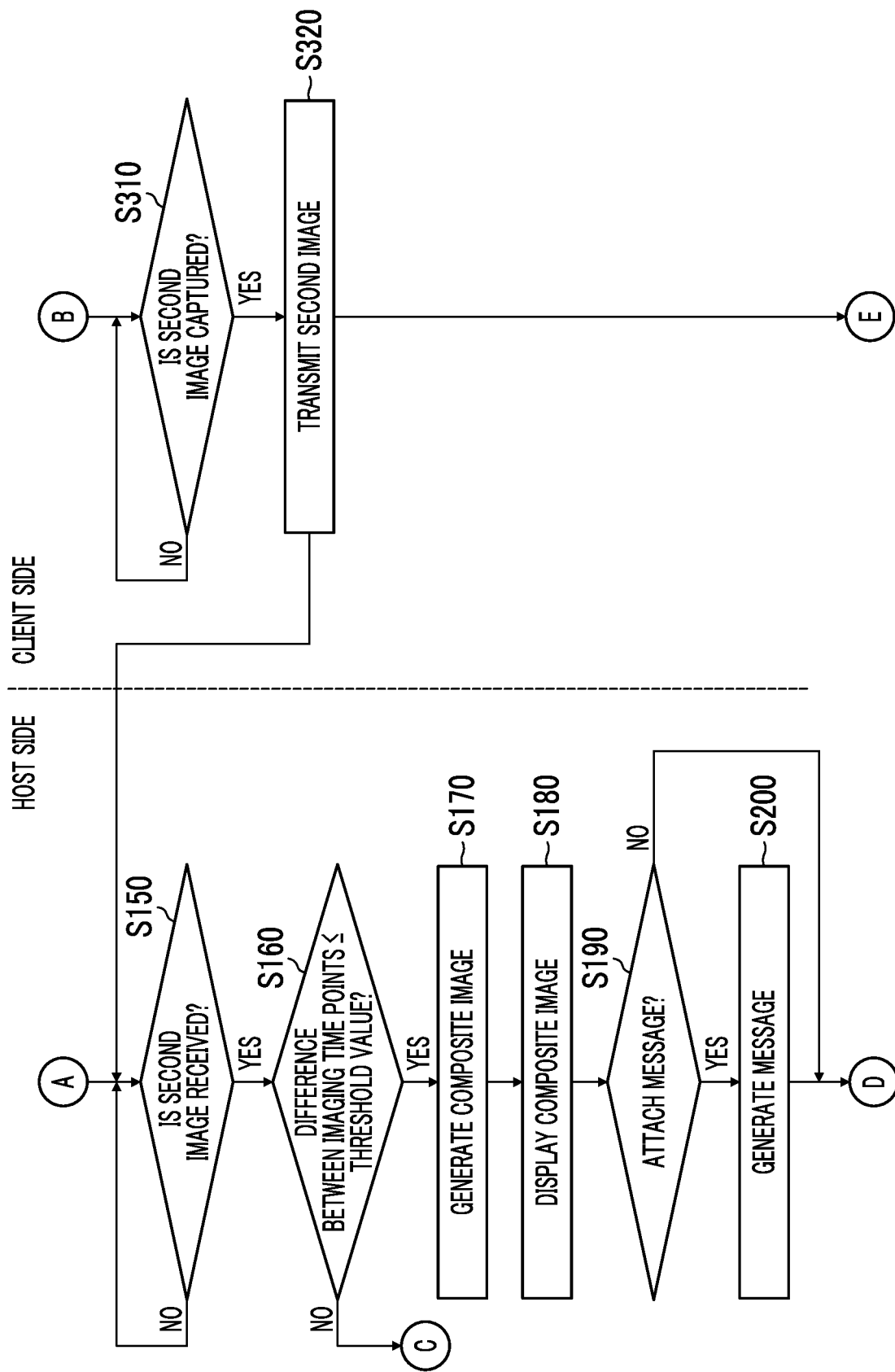
FIG. 8 is another flowchart illustrating the procedure of processing related to the image composition.
Figure 9:
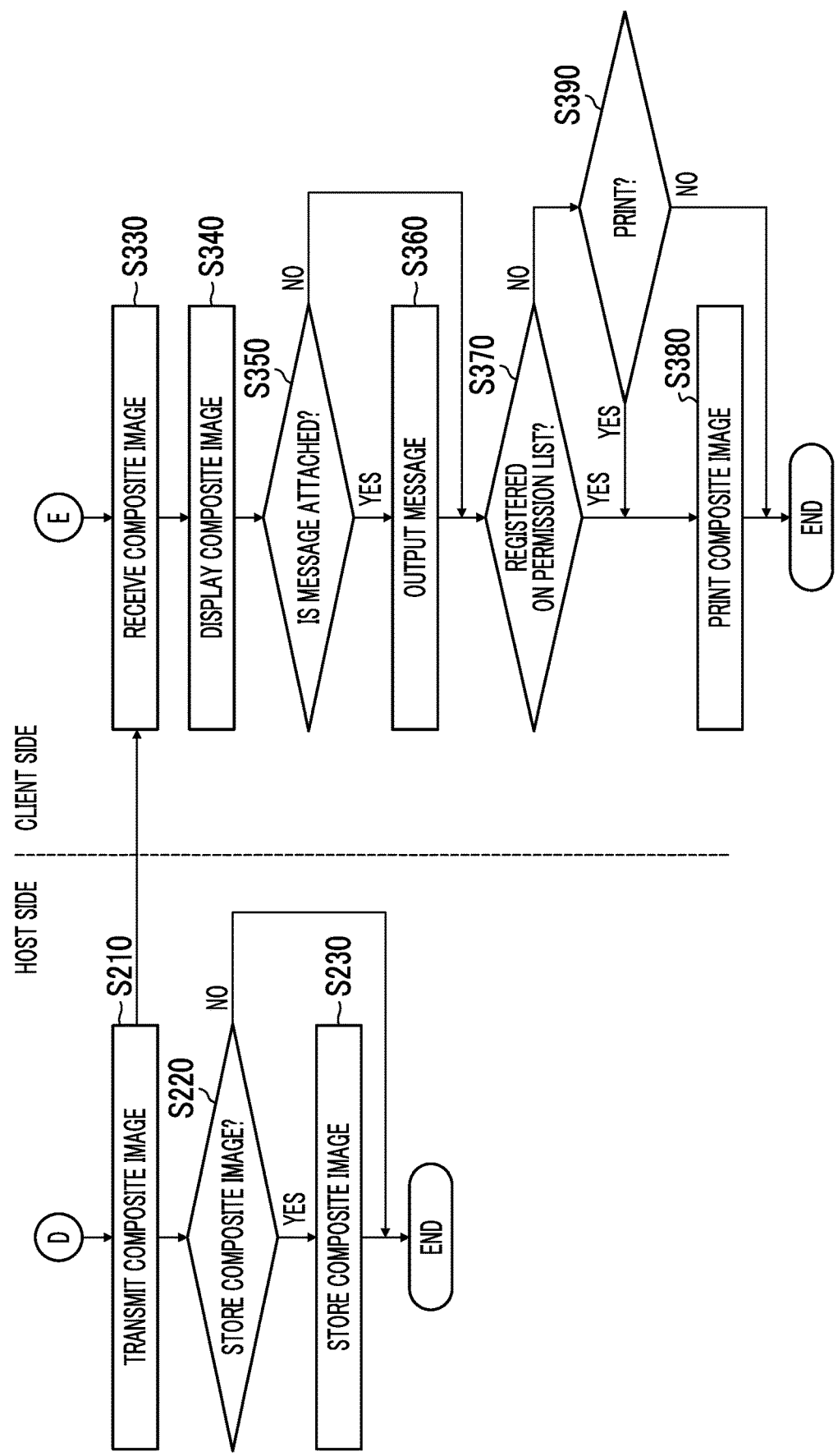
FIG. 9 is still another flowchart illustrating the procedure of processing related to the image composition.
Figure 10:
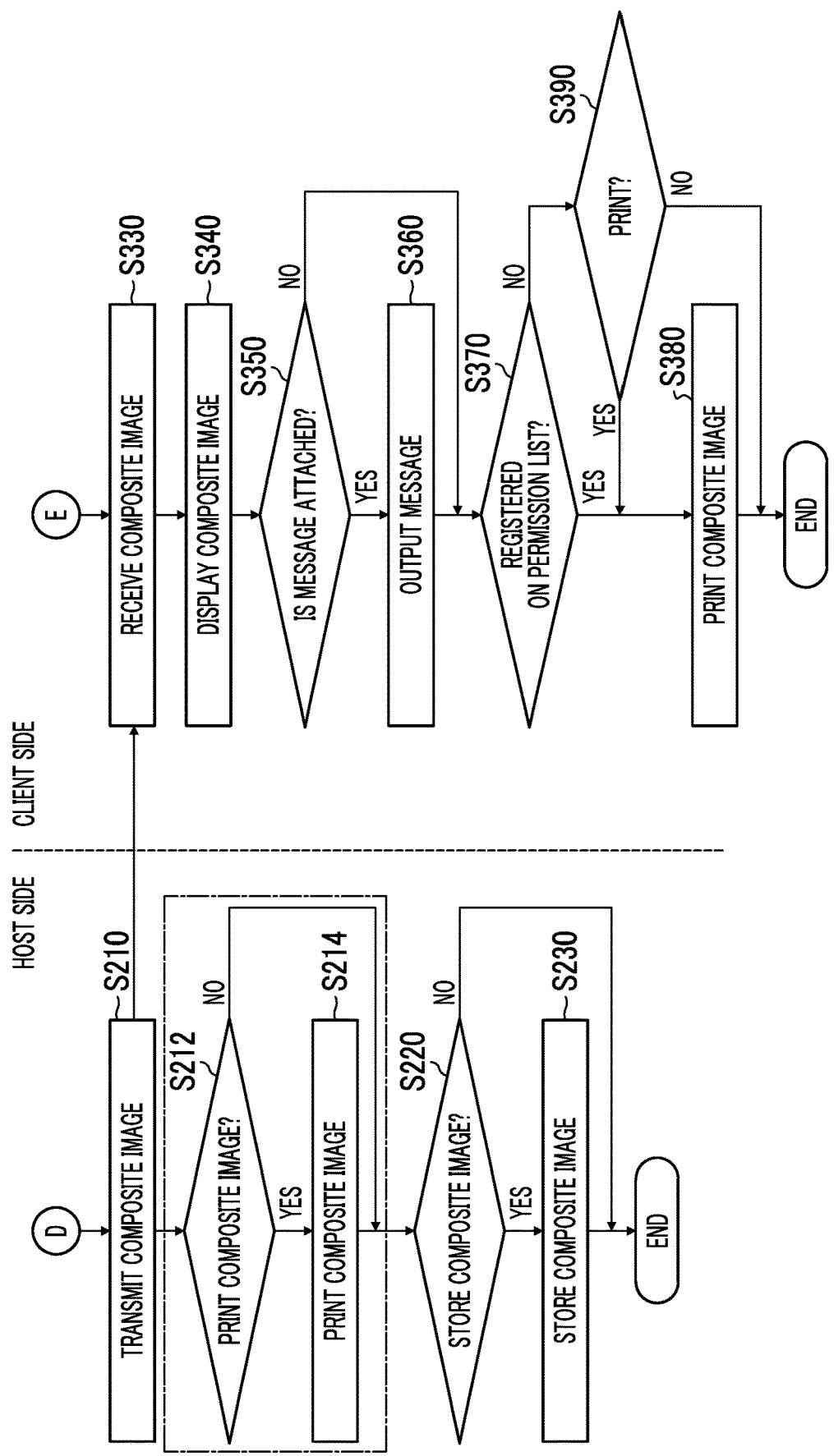
FIG. 10 is a flowchart illustrating a modification example of the procedure of processing related to the image composition.

An aspect in which the host does not print and stores the composite image, and in which the client prints and does not store the composite image is described with respect to the flowcharts of FIG. 7 to FIG. 9. However, an aspect related to printing and storage of the composite image may be different from the above aspect. For example, as illustrated in FIG. 10, in the host, the print control unit 100D (print control unit) may determine whether or not to print the composite image (step S212) and perform printing in a case where a positive determination is made (step S214). In this case, in the host, for example, the print control unit 100D can determine whether or not to print the composite image based on an operation of the user performed through the operation unit 98. In FIG. 10, steps (steps S212 and S214) surrounded by a dash-dotted line are added with respect to the flowchart of FIG. 9.

Figure 11:
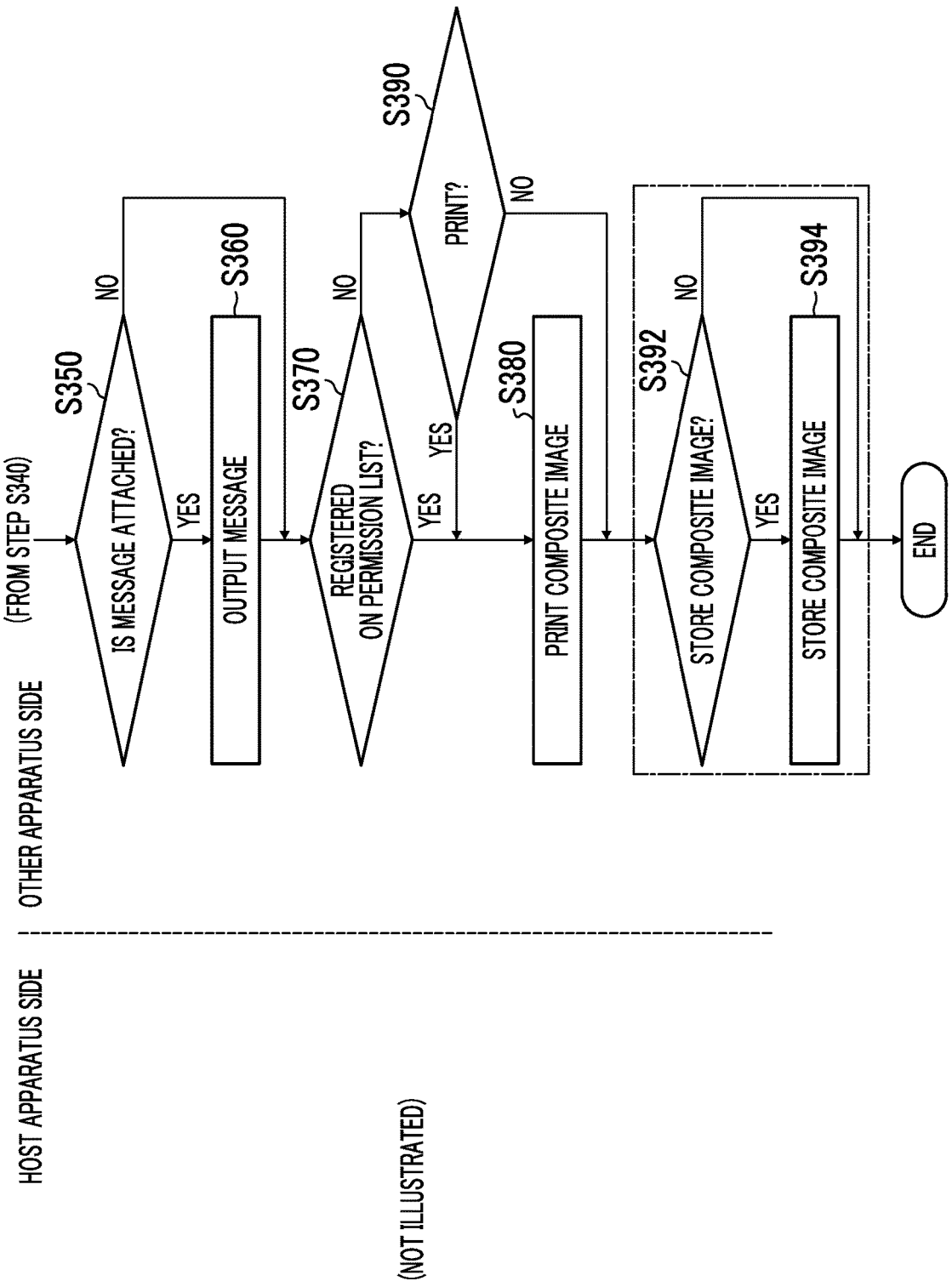
FIG. 11 is another flowchart illustrating the modification example of the procedure of processing related to the image composition.
Figure 12A:
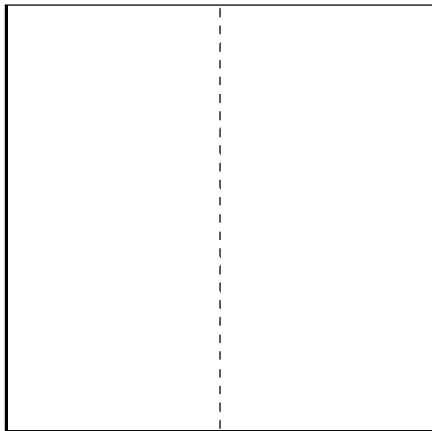
FIGS. 12A to 12E are diagrams illustrating patterns of the image composition.
Figure 12B:
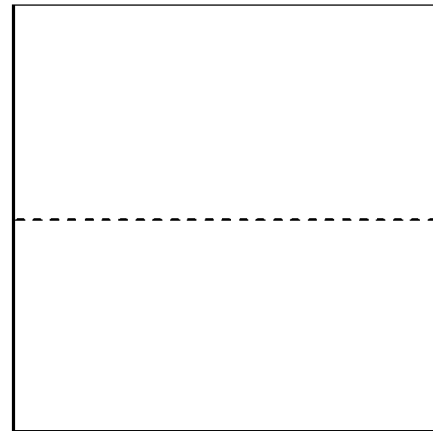
Figure 12C:
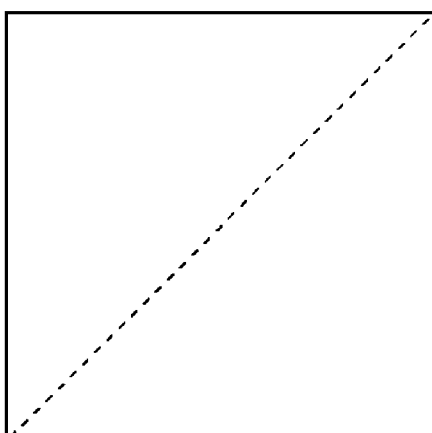
Figure 12D:
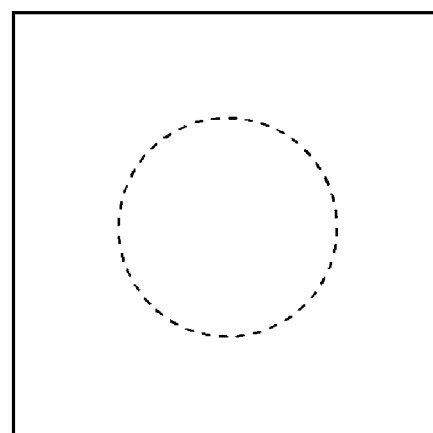
Figure 12E:
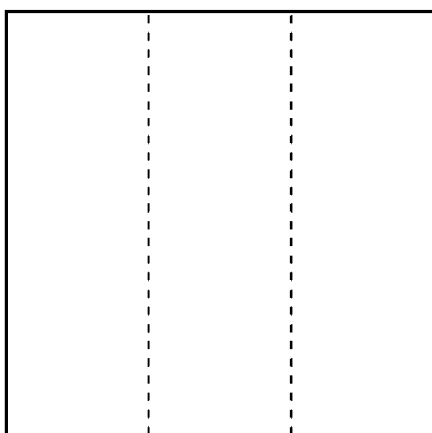

Meanwhile, the client may store the composite image. In this case, for example, as illustrated in FIG. 11, the storage control unit 100E (storage control unit) can determine whether or not to store the composite image in the memory 72 (non-temporary recording medium) (step S392). In a case where a positive determination is made in step S392, the storage control unit 100E stores the composite image in the memory 72 (step S394). In a case where the message is attached to the composite image, it is preferable that the storage control unit 100E stores the composite image in association with the message. In FIG. 11, steps (steps S392 and S394) surrounded by a dash-dotted line are added with respect to the flowchart of FIG. 9. In addition, in FIG. 11, processing on the host side is not illustrated.

<Generation of Composite Image Using Superimposition>

Figure 19A:
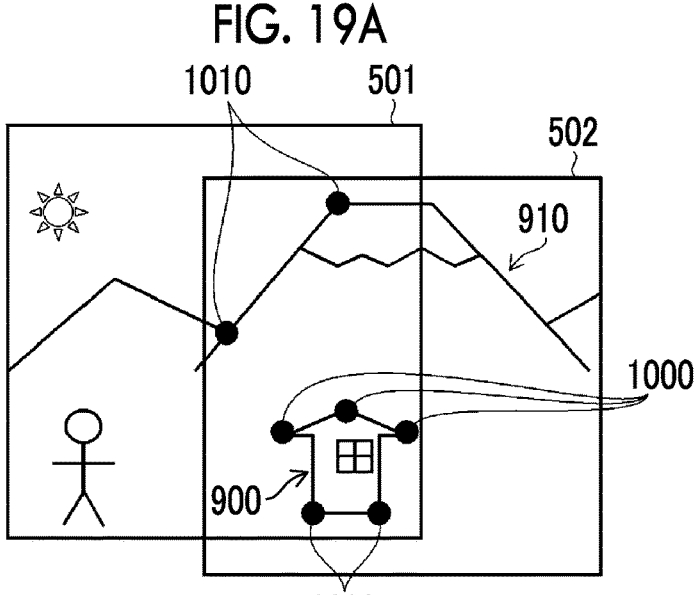
FIGS. 19A to 19C are diagrams illustrating an example of image composition using superimposition.
Figure 19B:
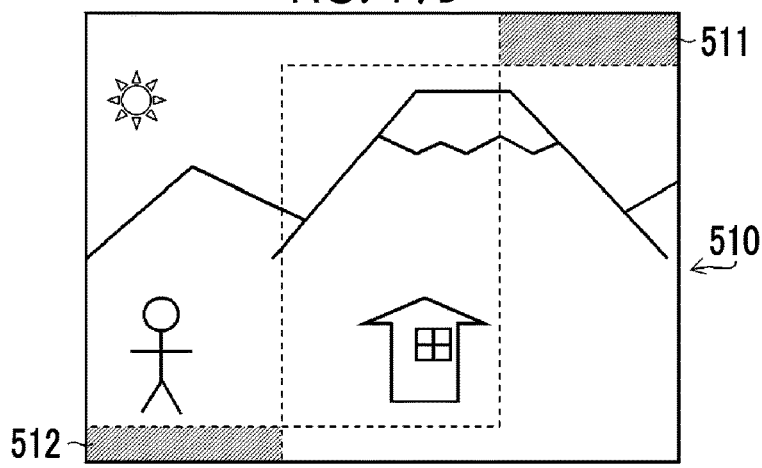
Figure 19C:
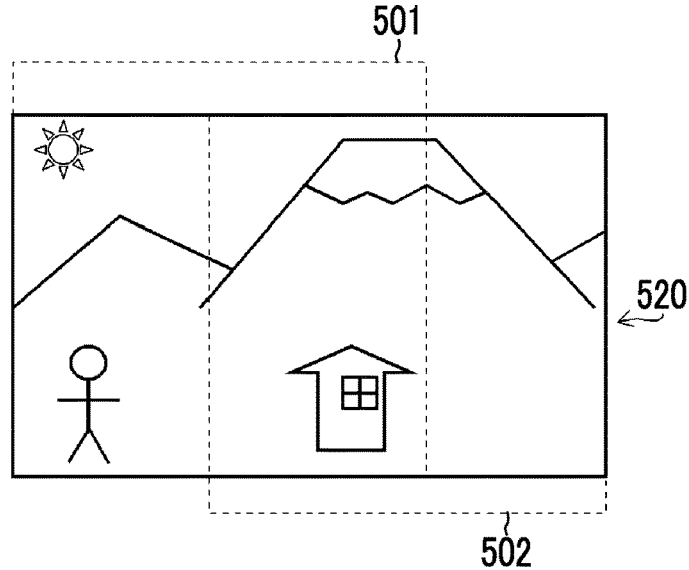

An aspect in which the image composition unit generates, as the composite image, an image in which the first image and the second image are arranged in different regions of one image is described with respect to FIG. 12A to FIG. 17C. However, in the digital camera with a printer 10 according to the embodiment of the present invention, the image composition unit 100B may generate, as the composite image, an image in which the first image and the second image are superimposed. FIGS. 19A to 19C are diagrams for describing such generation of the composite image using superimposition. In the example illustrated in FIG. 19A, in a case where an image 501 (first image) is captured by the host, and where an image 502 (second image) is captured by the client, the image composition unit 100B of the host extracts a feature point 1000 from the image 501 as a corner portion of a subject 900 (house) and extracts a feature point 1010 from the image 502 as a corner portion or an intersection of a ridgeline of a subject 910 (mountain). The image composition unit 100B can generate the composite image by superimposing the image 501 and the image 502 such that the feature points 1000 and 1010 (feature points) extracted from the image 501 (first image) and the image 502 (second image) match. The image composition unit 100B can extract the feature points from the image 501 and the image 502 using a well-known method. In addition, in a case of superimposition, the image composition unit 100B may perform image processing such as movement, rotation, and deformation on the image 501 and/or the image 502.

FIG. 19B illustrates an example of the composite image using superimposition. In this example, a composite image 510 of a panoramic image type is obtained, and an upper right region 511 and a lower left region 512 are blank (region in which image data is not present) due to deviation of the original images 501 and 502. In the drawing, a dotted line is a reference line indicating ranges of the original images 501 and 502.

FIG. 19C illustrates another example of the composite image using superimposition. Even in this example, a composite image 520 of a panoramic image type is obtained. However, in the composite image 520, the image composition unit 100B trims an image region into a rectangular shape. In the drawing, a dotted line is a reference line indicating ranges of the original images 501 and 502. In a case of generating the composite image using superimposition, the image composition unit 100B may generate an image such as the composite image 510 or generate an image such as the composite image 520.

By image composition illustrated in FIGS. 19A to 19C, the user of the digital camera with a printer 10 can enjoy the composite image by capturing images using a plurality of cameras.

<Modification Example of Printing Using Automatic Print Permission List>

An aspect in which the client automatically performs printing in a case where the client receives the composite image from the digital camera with a printer 10 registered on the "automatic print permission list" of the client is described using FIG. 9. However, automatically performing printing by the client is not limited to a case where the composite image is received. For example, in a case where the image captured by the client is transmitted to the host from the client, subjected to the image processing such as movement, rotation, and deformation on the host side, and then, transmitted back to the client from the host, the client may automatically print the image transmitted back from the host based on the "automatic print permission list". In addition, for example, in a case where the image captured by the client is transmitted to the host from the client, the message is attached to the image by the message processing unit 100F of the host, and the image is transmitted back to the client from the host, the client may automatically print the image transmitted back from the host.

While the embodiment of the present invention is described above, the present invention is not limited to the above aspect and can be subjected to various modifications without departing from a spirit of the present invention.

EXPLANATION OF REFERENCES

- 10: digital camera with printer
- 12: camera body
- 14: imaging lens
- 16: release button
- 18: audio recording button
- 20: electronic flash light emission window
- 22a: power button
- 22b: menu button
- 22c: OK button
- 22d: mode switching button
- 24: microphone hole
- 26: speaker hole
- 28: display
- 30: film lid cover
- 32a: joystick
- 32b: print button
- 32c: play button
- 32d: cancel button
- 34: film discharge port
- 42: instant film
- 42a: exposure surface
- 42b: observation surface
- 42c: exposure region
- 42d: pod portion
- 42e: development treatment liquid pod
- 42f: trap portion
- 42g: absorbent material
- 42h: observation region
- 42i: frame
- 52: film feeding mechanism
- 54: film transport mechanism
- 56: printhead
- 62: lens driving unit
- 64: image sensor
- 66: image sensor driving unit
- 68: analog signal processing unit
- 70: digital signal processing unit
- 72: memory
- 74: memory controller
- 76: display controller
- 78: communication unit
- 80: antenna
- 82: film feeding driving unit
- 84: film transport driving unit
- 86: head driving unit
- 88: strobe
- 90: electronic flash light emission control unit
- 92: microphone
- 94: speaker
- 96: audio signal processing unit
- 97: time tracking unit
- 98: operation unit
- 100: camera control unit
- 100A: communication control unit
- 100B: image composition unit
- 100C: output control unit
- 100D: print control unit
- 100E: storage control unit
- 100F: message processing unit
- 501: image
- 502: image
- 510: composite image
- 511: region
- 512: region
- 520: composite image
- 530: information
- 600: mark
- 610: two-dimensional barcode
- 900: subject
- 910: subject
- 1000: feature point
- 1010: feature point
- F: arrow
- S100 to S394: each step of processing in digital camera with printer

What is claimed is:

1. A digital camera, comprising:
   an imager;
   a printer;
   a storage configured to store an automatic print permission list; and
   a processor configured to:
      communicate with another digital camera to receive a composite image in which a first image captured by the other digital camera and a second image captured through the imager are composited;
      in a case where the other digital camera is registered in the automatic print permission list, cause the printer to print the received composite image independently of an instruction operation of a user; and
      in a case where the other digital camera is not registered in the automatic print permission list, cause the printer to print the received composite image according to the instruction operation of the user.

2. The digital camera according to claim 1, further comprising a display,
   wherein the processor is configured to:
   communicate with the other digital camera to receive the first image;
   cause the display to display the received first image; and
   transmit the second image to the other digital camera.

3. The digital camera according to claim 2, wherein the processor is configured to cause the display to display the received composite image.

4. The digital camera according to claim 1, further comprising a display,
   wherein the processor is configured to cause the display to display the received composite image.

5. The digital camera according to claim 1, wherein the processor is configured to:
   communicate with the other digital camera to receive information for prompting capturing of the second image; and
   output the received information.

6. The digital camera according to claim 5, wherein the processor is configured to transmit an image captured in accordance with the received information to the other digital camera as the second image.

7. The digital camera according to claim 1, wherein the processor is configured to communicate with the other digital camera to receive information indicating a message associated with the composite image.

8. The digital camera according to claim 7, wherein the processor is configured to output the message based on the received information.

9. The digital camera according to claim 1, wherein the processor is configured to communicate with the other digital camera using short range wireless communication.

10. The digital camera according to claim 1, wherein the processor is configured to communicate with the other digital camera through an information communication network.

11. A method of controlling a digital camera including an imager, a printer, and a storage configured to store an automatic print permission list, the method comprising:
    communicating with another digital camera to receive a composite image in which a first image captured by the other digital camera and a second image captured through the imager are composited;
    in a case where the other digital camera is registered in the automatic print permission list, causing the printer to print the received composite image independently of an instruction operation of a user; and
    in a case where the other digital camera is not registered in the automatic print permission list, causing the printer to print the received composite image according to the instruction operation of the user.

12. The method according to claim 11, wherein the digital camera includes a display, and the method further comprises:
    communicating with the other digital camera to receive the first image;
    causing the display to display the received first image; and
    transmitting the second image to the other digital camera.

13. The method according to claim 12, further comprising causing the display to display the received composite image.

14. The method according to claim 11, wherein:
    the digital camera includes a display; and
    the method further comprises causing the display to display the received composite image.

15. The method according to claim 11, further comprising:
    communicating with the other digital camera to receive information for prompting capturing of the second image; and
    outputting the received information.

16. The method according to claim 15, further comprising transmitting an image captured in accordance with the received information to the other digital camera as the second image.

17. The method according to claim 11, further comprising communicating with the other digital camera to receive information indicating a message associated with the composite image.

18. The method according to claim 17, further comprising outputting the message based on the received information.

19. The method according to claim 11, further comprising communicating with the other digital camera using short range wireless communication.

20. The method according to claim 11, further comprising communicating with the other digital camera through an information communication network.

* * * * *